(12) United States Patent
Rosen et al.

(10) Patent No.: US 6,901,137 B2
(45) Date of Patent: May 31, 2005

(54) DETECTING FAULTS IN SUBSCRIBER TELEPHONE LINES

(75) Inventors: Joseph S. Rosen, Chicago, IL (US); Susan E. McGill, Barrington, IL (US)

(73) Assignee: Teradyne, Inc., Boston, MA (US)

(*) Notice: Subject to any disclaimer, the term of this patent is extended or adjusted under 35 U.S.C. 154(b) by 0 days.

(21) Appl. No.: 10/236,128

(22) Filed: Sep. 6, 2002

(65) Prior Publication Data

US 2003/0007605 A1 Jan. 9, 2003

Related U.S. Application Data

(62) Division of application No. 09/410,237, filed on Sep. 30, 1999.

(51) Int. Cl.$^7$ .............................. H04M 1/24; H04M 3/22
(52) U.S. Cl. ...................... 379/1.03; 379/1.04; 379/24; 379/22.03
(58) Field of Search .......................... 379/1.01, 1.04, 379/27.01, 1.03, 9, 14, 14.01, 10.01, 12, 15.01, 15.02, 15.03, 15.05, 18, 22.03, 22.04, 24, 29.01, 29.05, 29.08, 30, 31

(56) References Cited

U.S. PATENT DOCUMENTS

| | | | | |
|---|---|---|---|---|
| 6,014,425 A | * | 1/2000 | Bingel et al. | 379/26.02 |
| 6,084,946 A | * | 7/2000 | Beierle | 379/30 |
| 6,091,713 A | * | 7/2000 | Lechleider et al. | 370/248 |
| 6,266,395 B1 | * | 7/2001 | Liu et al. | 379/27.01 |
| 6,285,653 B1 | * | 9/2001 | Koeman et al. | 370/201 |
| 6,292,539 B1 | * | 9/2001 | Eichen et al. | 379/1.04 |
| 6,487,241 B1 | * | 11/2002 | Cole | 375/220 |

* cited by examiner

*Primary Examiner*—Rexford Barnie
(74) *Attorney, Agent, or Firm*—Wolf, Greenfield & Sacks P.C.

(57) ABSTRACT

A method tests a subscriber line. The method includes providing a classifier to predict a performance characteristic of the line based at least in part on a value of an auxiliary variable. Each value of the auxiliary variable represents a property of the line. The method also includes performing electrical measurements on the subscriber line, using the measurements to predict a value of the auxiliary variable, and predicting the performance characteristic of the line. The act of predicting the characteristic applies the classifier to the predicted value of auxiliary variable.

15 Claims, 23 Drawing Sheets

DETECTING FAULTS IN SUBSCRIBER TELEPHONE LINES

This application is a Division of Ser. No. 09/410,237 filed Sep. 30, 1999.

BACKGROUND OF THE INVENTION

This application relates generally to communications networks, and more particularly, to detecting faults in communication lines.

Recently, there has been an increased demand for the subscriber lines of plain old telephone services (POTS's) to carry high-speed digital signals. The demand has been stimulated by home access to both the Internet and distant office computers. Both types of access typically employ a POTS line as part of the path for carrying digital signals.

POTS's lines were built to carry voice signals at audible frequencies and can also carry digital signals as tone signals in the near audible frequency range. Modern digital services such as ISDN and ADSL transmit data at frequencies well above the audible range. At these higher frequencies, POTS's lines that transmit voice signals well may transmit digital signals poorly. Nevertheless, many telephone operating companies (TELCO's) would like to offer ISDN and/or ADSL data services to their subscribers.

Telephone lines between a TELCO switch and subscribers' premises are frequent sources of poor performance at the high frequencies characteristic of ISDN and ADSL transmissions. Nevertheless, high cost has made widespread replacement of these subscriber lines an undesirable solution for providing subscribers with lines capable of supporting ISDN and ADSL. A less expensive alternative would be to repair or remove only those subscriber lines that are inadequate for transmitting high-speed digital data.

To limit replacement or repair to inadequate lines, TELCO's have placed some emphasis on developing methods for predicting which subscriber lines will support data services, such as ISDN and ADSL. Some emphasis has been also placed on predicting frequency ranges at which such data services will be supported. Some methods have also been developed for finding faults in subscriber lines already supporting data services so that such faults can be repaired.

Current methods for predicting the ability of subscriber lines to support high-speed digital transmissions are typically not automated, labor intensive, and entail test access at multiple points. Often, these methods entail using skilled interpretations of high frequency measurements of line parameters to determine data transmission abilities. At a network scale, such tests are very expensive to implement.

The present invention is directed to overcoming or, at least, reducing the affects of one or more of the problems set forth above.

SUMMARY OF THE INVENTION

In a first aspect, the invention provides a method of testing a subscriber line. The method includes providing a classifier to predict a performance characteristic of the line based at least in part on a value of an auxiliary variable. Each value of the auxiliary variable represents a property of the line. The method also includes performing electrical measurements on the subscriber line, using the measurements to predict a value of the auxiliary variable, and predicting the performance characteristic of the line. The act of predicting the characteristic applies the classifier to the predicted value of auxiliary variable.

In a second aspect, the invention provides a method of detecting a condition or fault in a subscriber line. The method includes classifying the line as a nominal line or a non-nominal line from electrical measurements. The method determines whether the line has the condition or fault from the electrical measurements and the classification.

In a third aspect, the invention provides a method for detecting a fault in a subscriber line. The method includes making a preliminary classification of the line as qualified or disqualified for a data service line in response to electrical measurements thereon. The method also includes determining whether the line has a fault from the electrical measurements and the preliminary classification.

In a fourth aspect, the invention provides a method of detecting a fault in a subscriber line. The method includes making a preliminary classification of the line as qualified or disqualified for a data service line in response to electrical measurements thereon. The method also includes determining whether the line has a fault from the electrical measurements and the preliminary classification.

In a fifth aspect, the invention provides a method of creating a stack of classifiers for detecting line faults. The method includes selecting a learning set of subscriber lines and determining the form of the classifier from values of features and auxiliary variables of the lines. A portion of the lines have the fault, and a portion of the lines do not have the fault. The value of the auxiliary variable determines whether the associated line is one of nominal and qualified for a data service.

In a sixth aspect, the invention provides a program storage device storing a computer executable program of instructions for performing one or more of the above-described methods.

Various embodiments use test accesses, which provide data on low frequency electrical properties of subscriber lines, to make predictions about high frequency performance.

BRIEF DESCRIPTION OF THE DRAWINGS

Other features and advantages of the invention will be apparent from the following description taken together with the drawings in which.

DESCRIPTION OF THE PREFERRED EMBODIMENTS

Measurement and Test Apparatus

Figure 1:
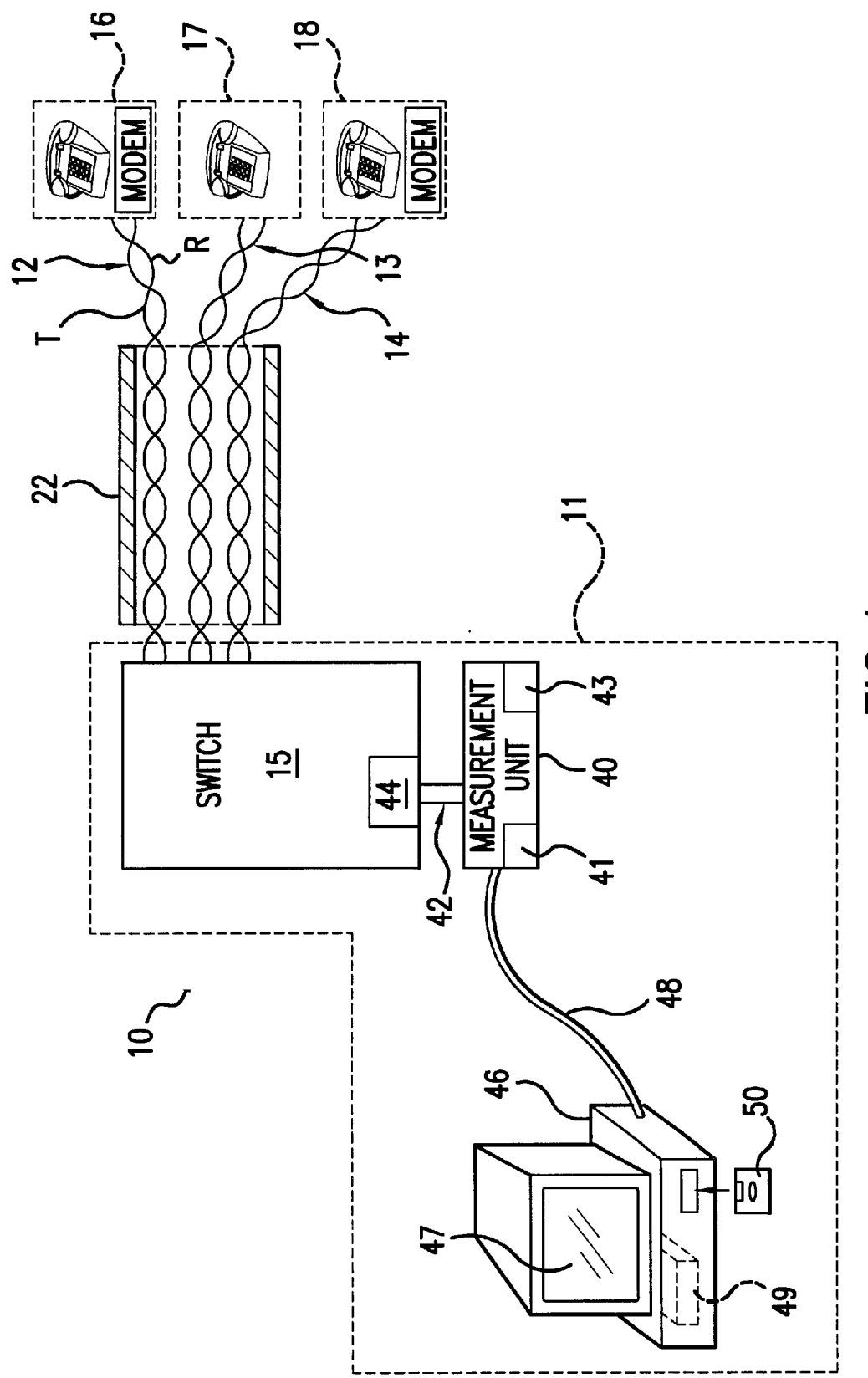
FIG. 1 shows a portion of a POTS network having a system for detecting faults in subscriber telephone lines.

FIG. 1 shows a portion of a POTS network 10 that has a system 11 for detecting faults in subscriber lines 12–14. The subscriber lines 12–14 connect subscriber units 16–18, i.e., modems and/or telephones, to a telephony switch 15. The switch 15 connects the subscriber lines 12–14 to the remainder of the telephone network 10. The switch 15 may be a POTS switch or another device, e.g., a digital subscriber loop access multiplexer (DSLAM).

Each subscriber line 12–14 consists of a standard twisted two-wire telephone line adapted to voice transmissions. The two wires are generally referred to as the ring AR@ and tip AT@ wires.

A large portion of each subscriber line 12–14 is housed in one or more standard telephone cables 22. The cable 22 carries many subscriber lines 12–14, e.g., more than a dozen, in a closely packed configuration. The close packing creates an electrical environment that changes transmission properties of the individual subscriber lines 12–14.

Electrical measurements for detecting line faults are performed by a measurement unit 40. In various embodiments, the measurement unit 40 includes one or both devices 41 and 43. Each device 41, 43 performs one-ended electrical measurements on selected lines 12–14. In preferred embodiments, the electrical measurements are one-ended. The device 41 performs measurements on tip and ring wires of a selected subscriber line 12–14 in a common mode configuration and produces results useful for detecting split pairs. The, device 43 can measure admittances of the tip and ring wires of a selected line 12–14 either separately or together and produces data useful for determining the specific physical line structure. The measurement unit 40 may also house other devices (not shown) for performing other types of electrical measurements, i.e., one-ended or two-ended measurements. The measurement unit 40 couples to the switch 15 via a test bus 42.

The devices 41, 43 connect to the switch 15 through the test bus 42 and a standard voice test access 44. The voice test access 44 electrically connects either the device 41 or device 43 to the subscriber lines 12–14 selected for testing. The voice test access 44 generally transmits electrical signals with low frequencies between about 100 Hetz (Hz) and 20 kilo Hz (KHz). But, the test access 44 may transmit signals at higher frequencies, e.g., up to 100 to 300 KHz, in some switches 15.

The measurement unit 40 is controlled by computer 46, which selects the types of measurements performed, the device 41, 43 used, and the subscriber lines 12–14 to test. The computer 46 sends control signals to the measurement unit 40 via a connection 48, e.g., a line, network, or dedicated wire, and receives measurement results from the measurement unit 40 via the same connection 48.

The computer 46 contains a software program for controlling line testing by the measurement unit 40 and for detecting line conditions or faults with results from the measurement unit 40. The software program is stored, in executable form, in a data storage device 49, e.g., a hard drive or random access memory (RAM). The program may also be encoded on a readable storage medium 50, such as an optical or magnetic disk, from which the program can be executed.

To perform a test, the measurement unit 40 signals the voice test access 44 to connect the line 12–14 to be tested to wires of the bus 42 for connecting to internal devices 41, 43. Then, one or both of the internal devices 41, 43 performs electrical measurements on the selected line 12–14. After the measurements are completed, the measurement unit 40 signals the switch 15 to disconnect the line 12–14 from the wires of the bus 42.

The computer 46 can classify selected subscriber lines 12–14 prior to fully connecting the lines 12–14 for data services. The range of possible classes to which a line 12 14 can be assigned will depend on the business needs of a TELCO. A simple, but very useful set of classes is "qualified" and "disqualified" to provide data services. Qualification is based on determining, with high certainty, that a selected line 12–14 will support a specified data service. Disqualification is based on determining, with high certainty, that the selected line 12–14 will not support the specified data service.

Figure 2A:
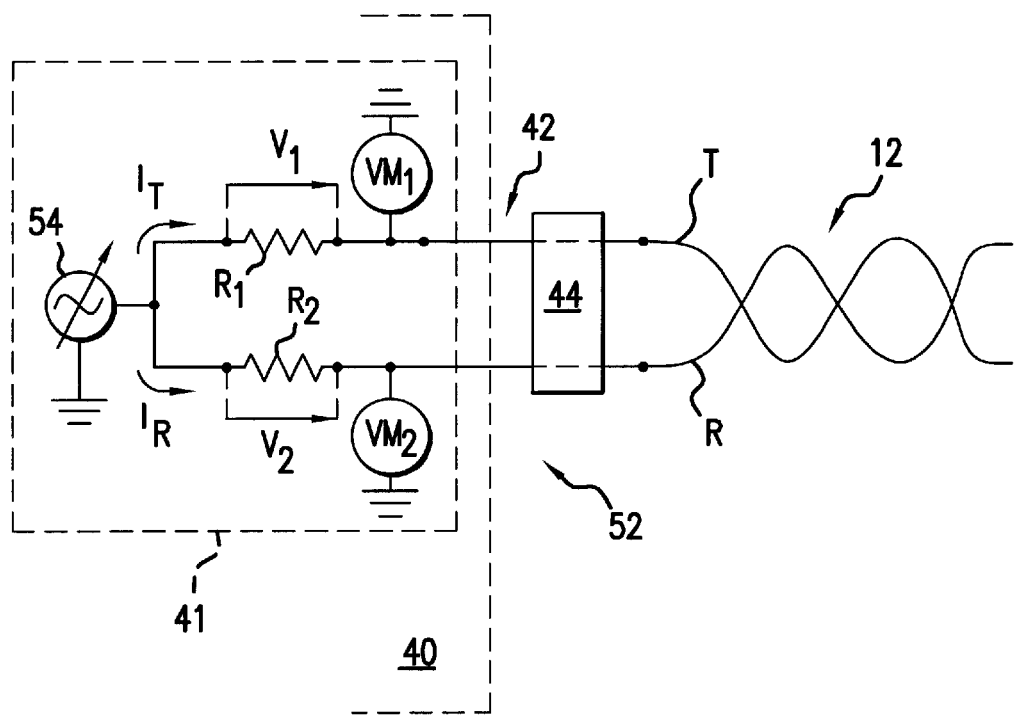
FIG. 2A shows a first measuring setup for making one-ended electrical measurements on a subscriber telephone line.

FIG. 2A shows a first setup 52 for performing one type of one-ended electrical measurements with the device 41. The measurements are used to detect faults such as split pairs in the subscriber lines 12–14 of FIG. 1.

The device 41 has a variable frequency voltage source 54 for driving the tip and ring wires T, R of the subscriber line 12–14 under test. The voltage source drives both wires together, i.e., in a common mode configuration, at a frequency controlled by the measurement unit 40. The tip and ring wires T, R of the line 12–14 under test are connected to the device 41 via the voice test access 44.

The voltage source 54 connects to one side of resistors $R_1$ and $R_2$. The second side of resistors $R_1$ and $R_2$ connect to the respective tip and ring wires T, R of the subscriber line 12–14 under test. Thus, the voltage source 54 drives the tip and ring wires T, R in common mode through the corresponding resistors $R_1$ and $R_2$.

The resistors $R_1$ and $R_2$ have equal resistances so that the voltage source 54 induces equal voltages $V_1$, $V_2$ between each resistor $R_1$, $R_2$ and ground if the currents $I_T$, $I_R$ therein are also equal. Differences in the input impedances $Z_T$, $Z_R$ of the tip and ring wires T, R make the voltages $V_1$, $V_2$ differ in amplitude and/or phase. For example, mutual inductance effects produced by a split pair can make the input impedances $Z_T$, $Z_R$ unequal.

Voltmeters $VM_1$ and $VM_2$ measure amplitudes and phases of voltages $V_1$ and $V_2$, respectively. From measurements of the voltmeters $VM_1$ and $VM_2$, the computer 46 can obtain the phase difference between $V_1$ and $V_2$.

Figure 2B:
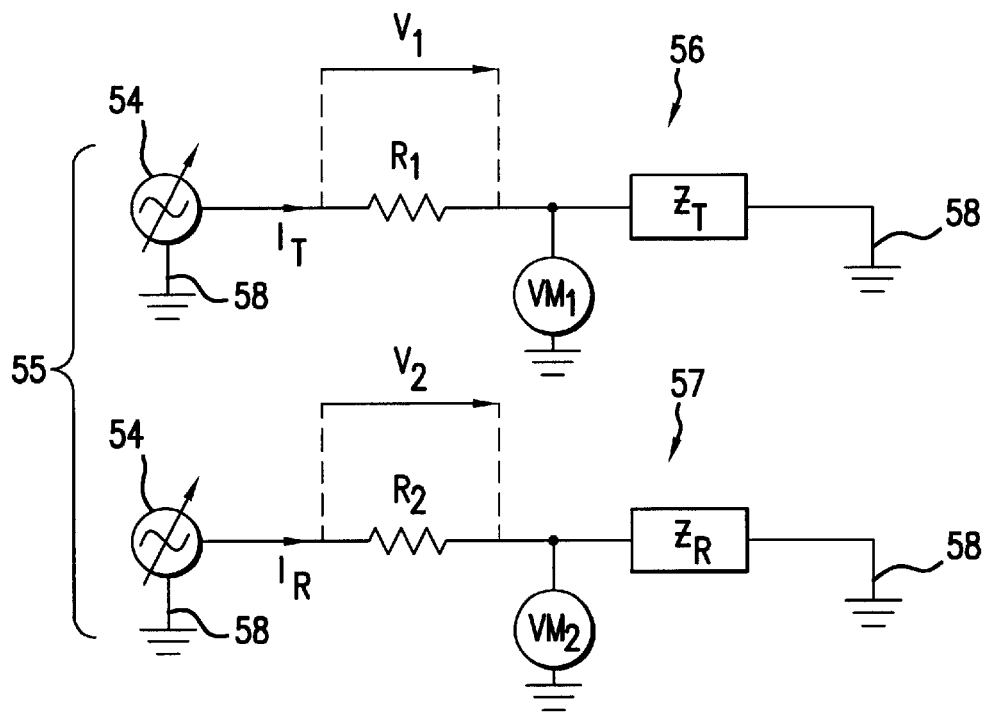
FIG. 2B is an equivalent circuit for the measuring setup of FIG. 2A.
Figure 4:
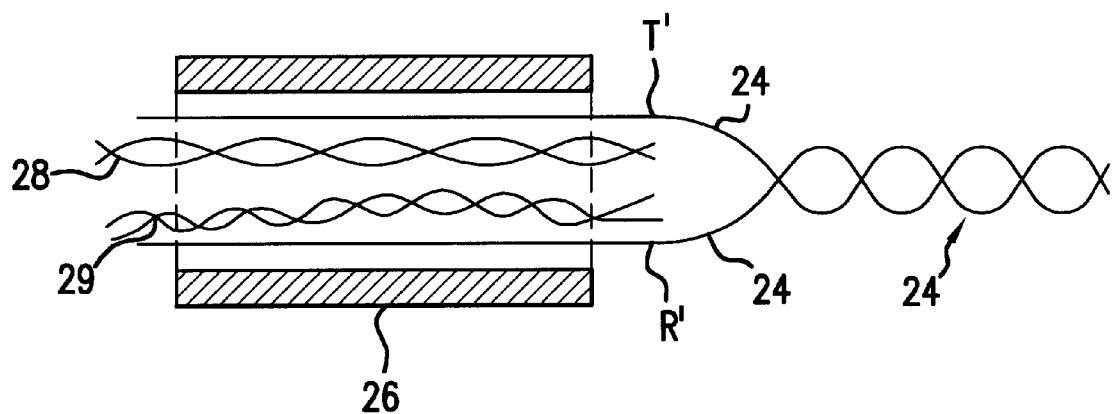
FIG. 4 shows a split pair fault in a subscriber line.

FIG. 2B shows an equivalent circuit 55 for the measurement setup 52 of FIG. 4. In the common mode configuration, the tip and ring wires T, R act as elements of independent circuits 56, 57 that connect the voltage source 54 to a common ground 58. The tip wire T is equivalent to an impedance $Z_T$ in the circuit 56, and the ring wire R is equivalent to an impedance $Z_R$ in the circuit 57.

The input impedances $Z_T$ and $Z_R$ may have different amplitudes and/or phases due to the presence of a fault on either the tip or ring wires T, R. Different values for $Z_T$ and $Z_R$ produce different currents $I_T$ and $I_R$ in the circuits 56 and 57 and different measured voltages $V_1$ and $V_2$. The phase of the voltage difference $V_1-V_2$ is proportional to the phase difference between the input impedances of the tip and ring wires T, R. In the phase of the difference $V_1-V_2$, termination effects associated with the attached subscriber unit 16 can largely be ignored.

Figure 2C:
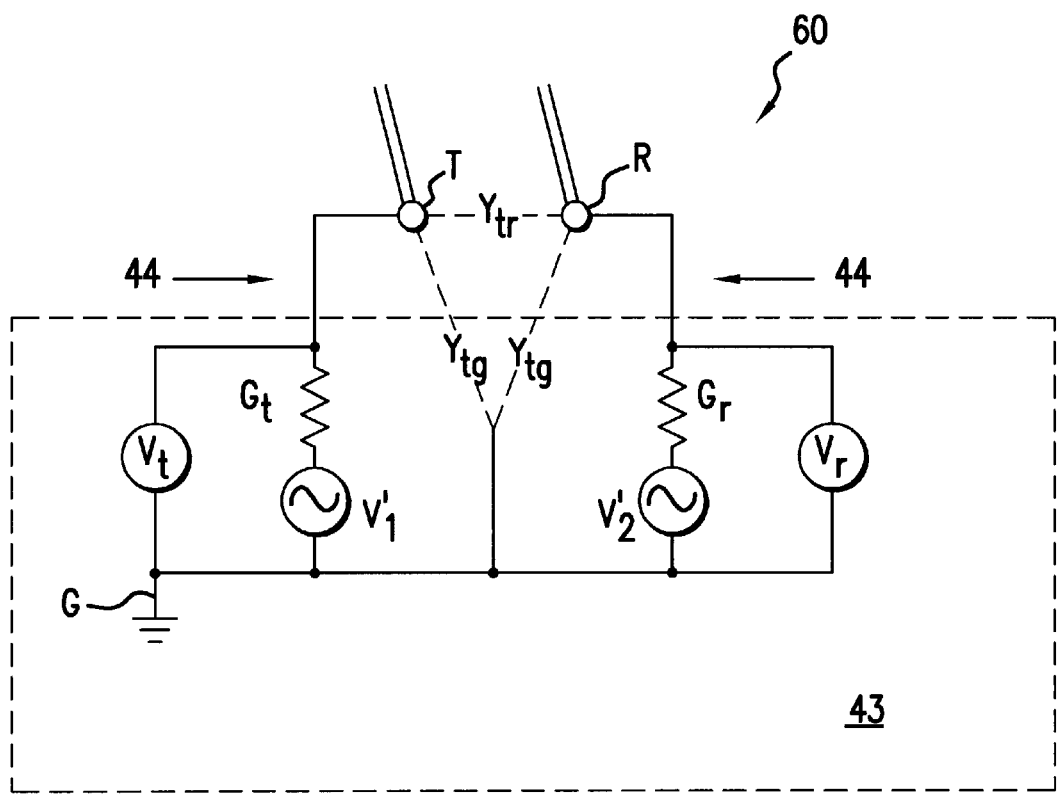
FIG. 2C shows a second measuring setup for making one-ended electrical measurements on a subscriber telephone line.

FIG. 2C shows a measuring setup 60 for performing one-ended electrical measurements on a selected subscriber line 12–14 with the device 43 shown in FIG. 1. The device 43 measures electrical properties, which can be used to determine the specific physical structure of the lines 12–14 and to determine line conditions and faults as is described below. Some methods for detecting line faults and conditions with the device 43 have been described in U.S. application Ser. No. 09/294,563 ('563), filed Apr. 20, 1999. The '563 application is incorporated herein, by reference, in its entirety.

The device 43 is adapted to measure admittances between the tip wire T, ring wire R, and ground G for a subscriber line 12–14 being tested. The tip and ring wires T, R of the line 12–14 being tested couple to driving voltages $V_1'$ and $V_2'$ through known conductances $G_t$ and $G_r$. The tip and ring wires T, R also connect to voltmeters $V_t$ and $V_r$. The $V_t$ and $V_r$ voltmeters read the voltage between the tip wire T and ground G and between the ring wire R and ground G, respectively. The readings from the voltmeters $V_t$ and $V_r$ enable the computer 46 to determine three admittances $Y_{tg}$, $Y_{tr}$, and $Y_{rg}$ between the pairs tip-ground, tip-ring, and ring-ground, respectively. The device 43 can measure the admittances at preselected frequencies in the range supported by the voice test access 44. The '563 application has described methods for performing such measurements.

Figure 3:
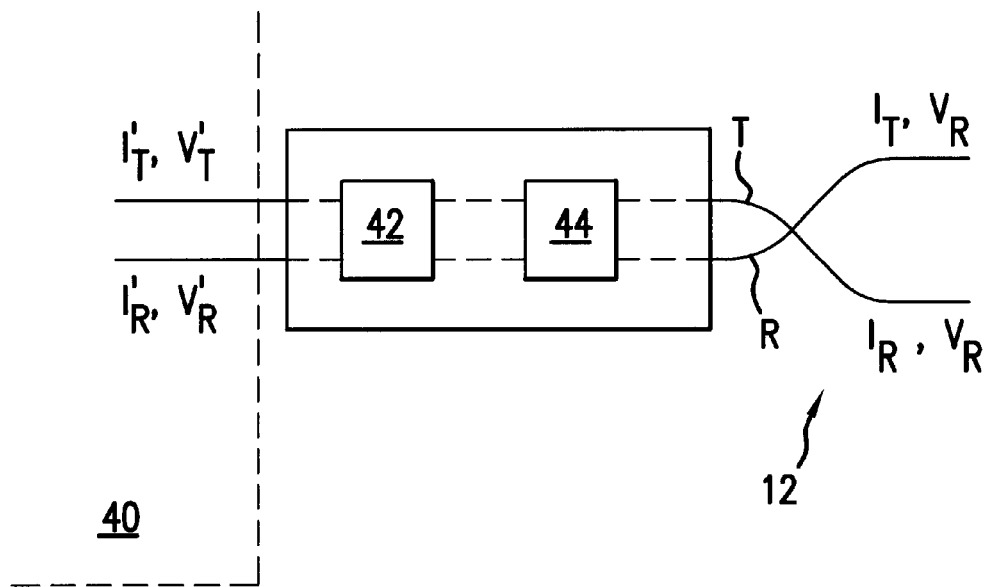
FIG. 3 illustrates signal distortions produced by the test bus and standard voice test access.

Referring to FIG. 3, the computer 46 may compensate for signal distortions introduced by the test bus 42 and/or the voice test access 44. To perform compensation, the computer 46 treats the two lines of the combined bus 42 and test access 44 as a linear two port systems. Then, the currents and voltages $I_T'$, $V_T'$ and $I_R'$, $V_R'$ at the output terminals of the measurement device 40 are related to the currents and voltages $I_T$, $V_T$ and $I_R$, $V_R$ on the output terminals of the tip and ring wires T, R by the following 2×2 matrix equations:

$$[I_T, V_T] = A(f)[I_T', V_T']$$

and $$[I_T, V_T] = A'(f)[I_R', V_R'].$$

The frequency dependent matrices A(f) and A'(f) are determined experimentally for each bus 42 and voice test access 44. Then, the computer 46 calculates the impedances or admittances of the tip and ring wires T, R with the currents and voltages $I_T$, $V_T$ and $I_R$, $V_R$ obtained from the above equations.

The measurement unit 40 and computer 46 can detect faults such as split pairs, resistive imbalances, metallic faults, load coils, bridged taps, gauge mixtures, and high signal attenuations. Co-pending U.S. patent application Ser. No. 09/285,954 ('954), filed Apr. 2, 1999, describes the detection of some of these faults and is incorporated herein by reference in its entirety.

Split Pairs

Referring again to FIG. 1, close proximity can inductively produce cross talk between the subscriber lines 12–14. Cross talk is frequently caused by large noise or ringing signals on one of the lines 12–14. The large signal inductively produces signals on nearby lines 12–14. To reduce cross talk, the tip and ring wires T, R of each subscriber line 12–14 are either tightly twisted together or kept in close proximity in the cable 22. In this way, stray signals affect both wires of a pair so that induced signals do not impact the difference signal between the tip and ring wires.

Referring to FIG. 4, the tip and ring wires T, R' of a subscriber line 24 are separated spatially in a portion of cable 26. The portion of the subscriber line 24 in which the tip and ring wires T', R' are spatially separated is referred to as a split pair. A split pair T', R' has a high risk of picking up cross talk other lines 28–29 in the same cable 26 or external noise sources such as power lines (not shown).

Split pairs also introduce impedance discontinuities into subscriber lines, because the split pair creates a localized and abrupt impedance variation. Impedance discontinuities can cause signal reflections and high signal attenuations for high-speed digital transmissions.

Figure 5:
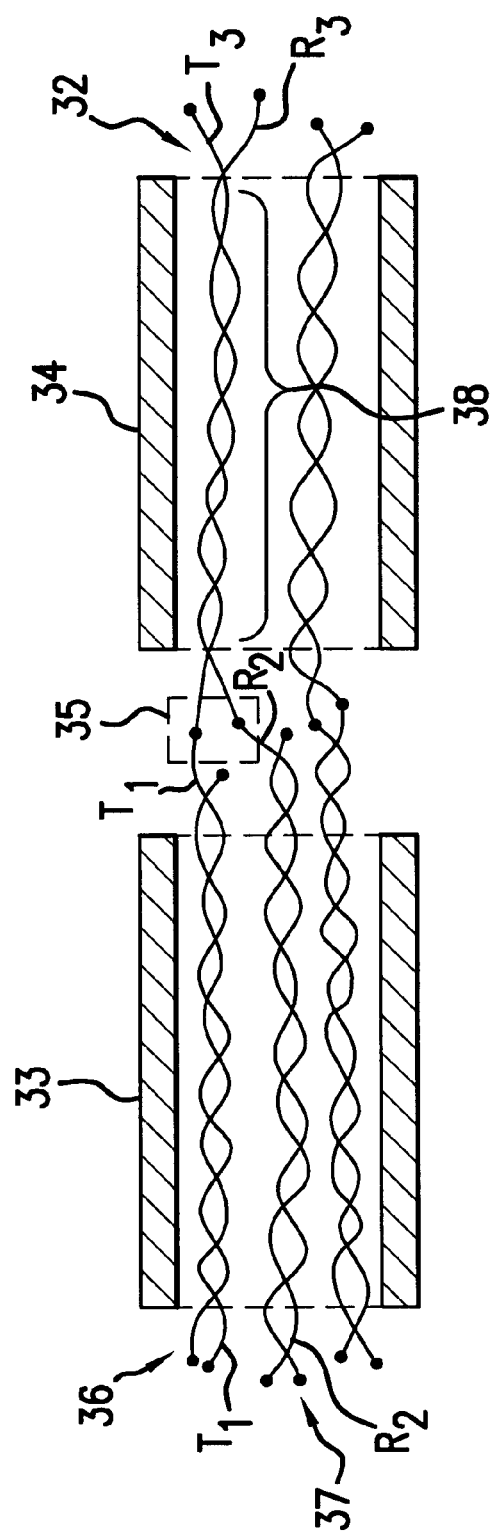
FIG. 5 shows how a splice error can produce a split pair fault.

FIG. 5 illustrates one type of split pair, i.e., a split pair caused by a splice error. The splice error occurred when two portions of a subscriber line 32, which are located in two different cables 33, 34, were joined. The splice 35 has joined tip and ring wires $T_1$, $R_2$ from two different twisted pair lines 36, 37 in the cable 33 to tip and ring wires $T_3$, $R_3$ of a single twisted pair 38 in the adjacent cable 34. The tip and ring wires $T_1$, $R_2$ of the portion of the subscriber line 32 are widely separated in a substantial portion of the cable 33. Thus, the tip and ring wires $T_1$, $R_2$ form a split pair.

Detection of split pair faults is difficult for several reasons. First, split pairs do not produce easily detected effects such as metallic faults, i.e., broken wires or shorted wires, or impedance imbalances. Second, split pairs produce cross talk that produce intermittent faults depending on the signals on nearby lines, e.g., intermittent ringing signals. The intermittency makes such faults difficult to recognize.

Conventional tests have not been very successful in detecting split pairs. Nevertheless, split pairs can degrade the quality of a subscriber line for high-speed data services.

Figure 6A:
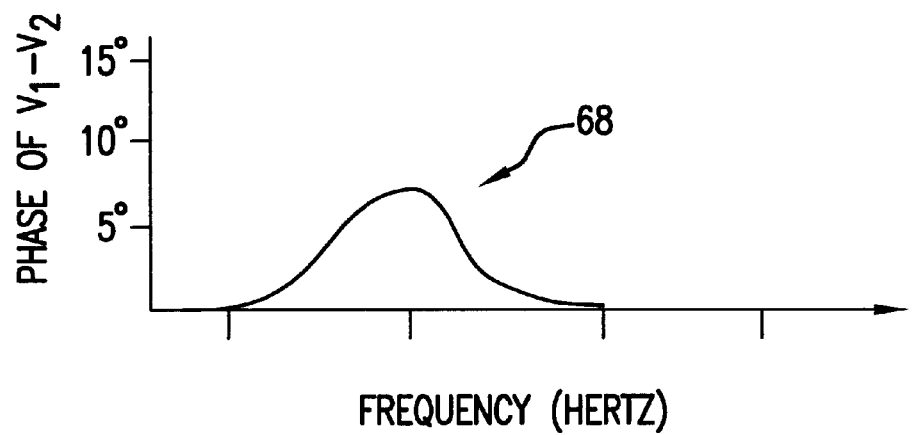
FIG. 6A shows a phase measurement signature of a resistive imbalance on a subscriber line.
Figure 6B:
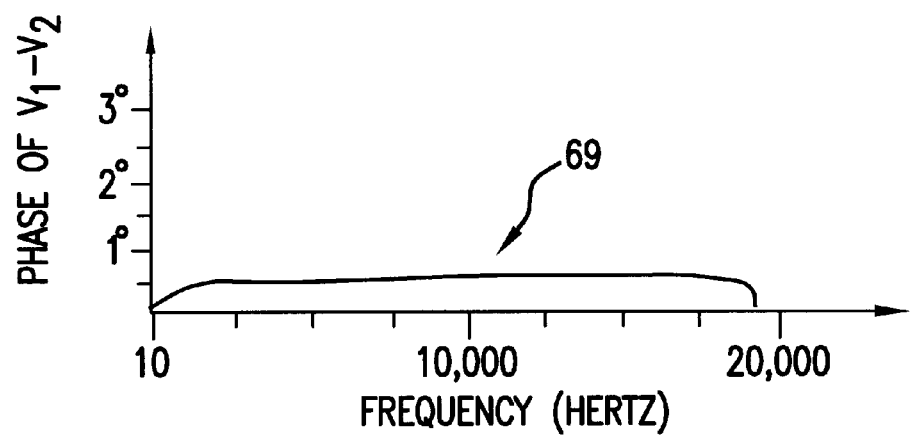
FIG. 6B shows a phase measurement signature of a split pair fault on a subscriber line.

FIGS. 6A and 6B provide graphs 68, 69 of the phase of the voltage difference $V_1-V_2$ between resistors $R_1$ and $R_2$ while testing two exemplary subscriber lines 12–14 with the measurement setup 52 of FIG. 4. The graphs 68, 69 provide frequency sweeps of the phase difference, which show signatures of faults that can interfere with high-speed data services, e.g., ISDN or ADSL.

Referring to FIG. 6A, the graph 68 shows a signature for a resistive imbalance fault on the tested subscriber line 12–14. The signature for a resistive imbalance is a pronounced peak in the phase of the voltage difference $V_1$–$V_2$. The peak appears in the phase difference between impedances of the tip and ring wires. The peak has a narrow width that is typically not more than a few hundred to about 2 KHz. Typically, the phase has a height of greater than about 5°.

Referring to FIG. 6B, the graph 69 shows a signature for a split pair fault on the tested subscriber line 12–14. The signature is a flat and substantially constant phase for $V_1$–$V_2$, i.e., a substantially constant non-zero phase difference between the input impedances $Z_T$, $Z_R$ of the wires T, R. Typically, the phase has a value of between about 0.5° and 1.5°. The nonzero and flat phase extends over a region of frequencies having a width of at least 5,000 kilo Hz. The phase of $Z_T$ and $Z_R$ may remain flat, nonzero, and peakless from about 100 Hz to about 20,000 Hz if a split pair is present, i.e., over the frequency range measurable through the voice test access 44, shown in FIG. 1. A nonzero and substantially frequency independent phase difference between the input impedances $Z_T$, $Z_R$ of the tip and ring wires is a signature for a split pair on the subscriber line 12–14 being tested.

Figure 7:
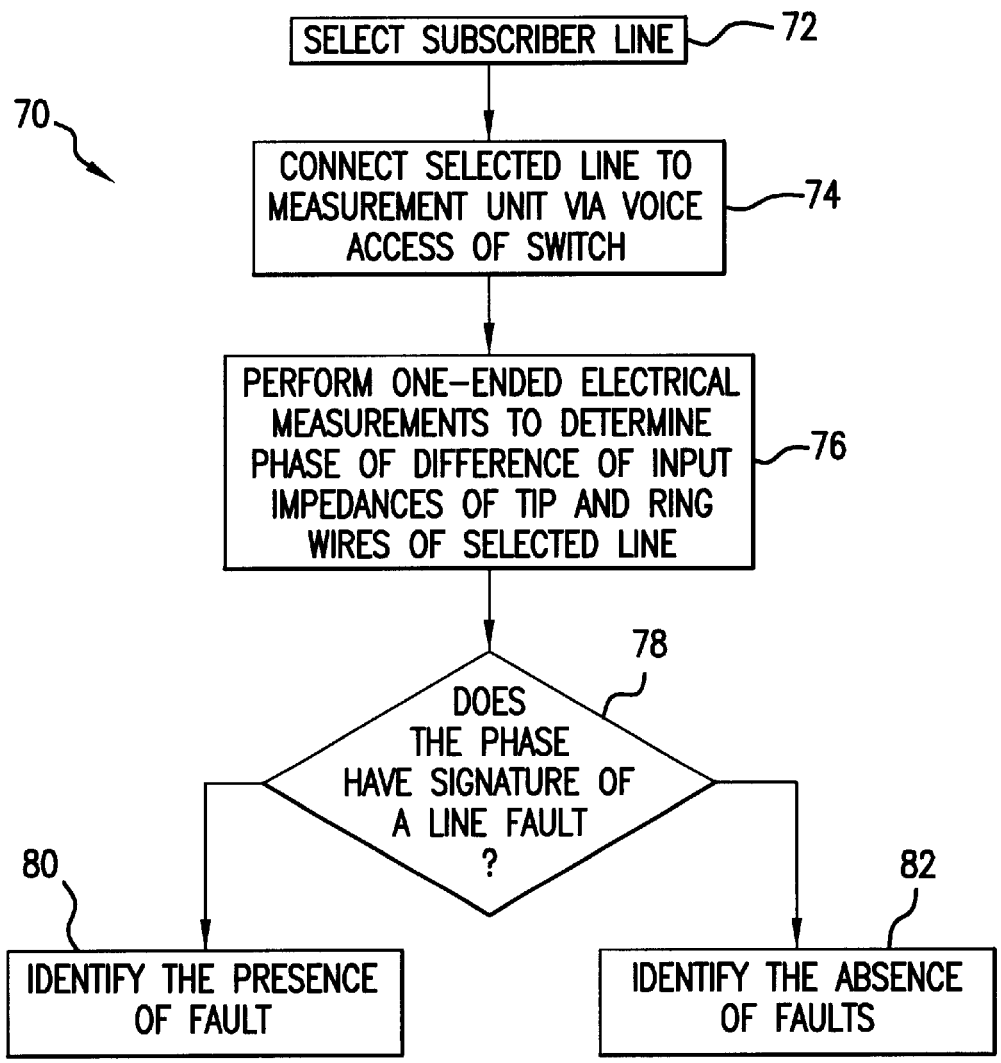
FIG. 7 is a flow chart illustrating a method of detecting faults on subscriber lines with the system of FIGS. 1, 4, and 5.

FIG. 7 is a flow chart illustrating a method 70 of detecting a fault in the subscriber lines 12–14 with the system 11 of FIG. 1. The computer 46 selects the subscriber line 12–14 to test for faults (step 72). The measurement unit 40 electrically connects to the selected line 12–14 via the voice test access 44 of the TELCO switch 15 (step 74). The connection produces the measurement setup 52 illustrated in FIGS. 4 and 5.

The measurement unit 40 performs one-ended electrical measurements to determine a signal proportional to the phase difference of the input impedances $Z_T$, $Z_R$ of the tip and ring wires of the selected line 12–14 (step 76). The quantity actually measured is the phase of $V_1$–$V_2$, which is proportional to the phase of the difference of the input impedances $Z_T$, $Z_R$. The device 41 measures the phase by driving the tip and ring wires in the common mode configuration shown in FIG. 4. The driving frequencies are between about 100 Hz to 20,000 kilo Hz and accessible via the voice test access 44. Such frequencies are very low compared to transmission frequencies of high-speed data services such as ISDN and ADSL.

The computer 46 analyzes the measurements of the phase as a function of frequency to determine whether the phase has a signature for a line fault (step 78). The line faults that produce signatures in the phase include split pairs and resistance imbalances as described above in relation to FIGS. 6B and 6A, respectively. Other signatures are possible, e.g., for other types of faults. If a signature for a line fault is found, the computer 46 identifies that a fault has been detected (step 80). The identification may entail making a reporting act. The reporting act may include making an entry in a file that lists the faults on the subscriber lines 12–14, displaying a warning on an operator's display screen 47 or on a screen of a service technician (not show), or informing a program that allocates subscriber lines 12–14. If no signatures for line faults are found, the computer 46 identifies the absence of the line faults associated with signatures for the selected line 12–14, e.g., by performing a reporting act (step 82).

Figure 8:
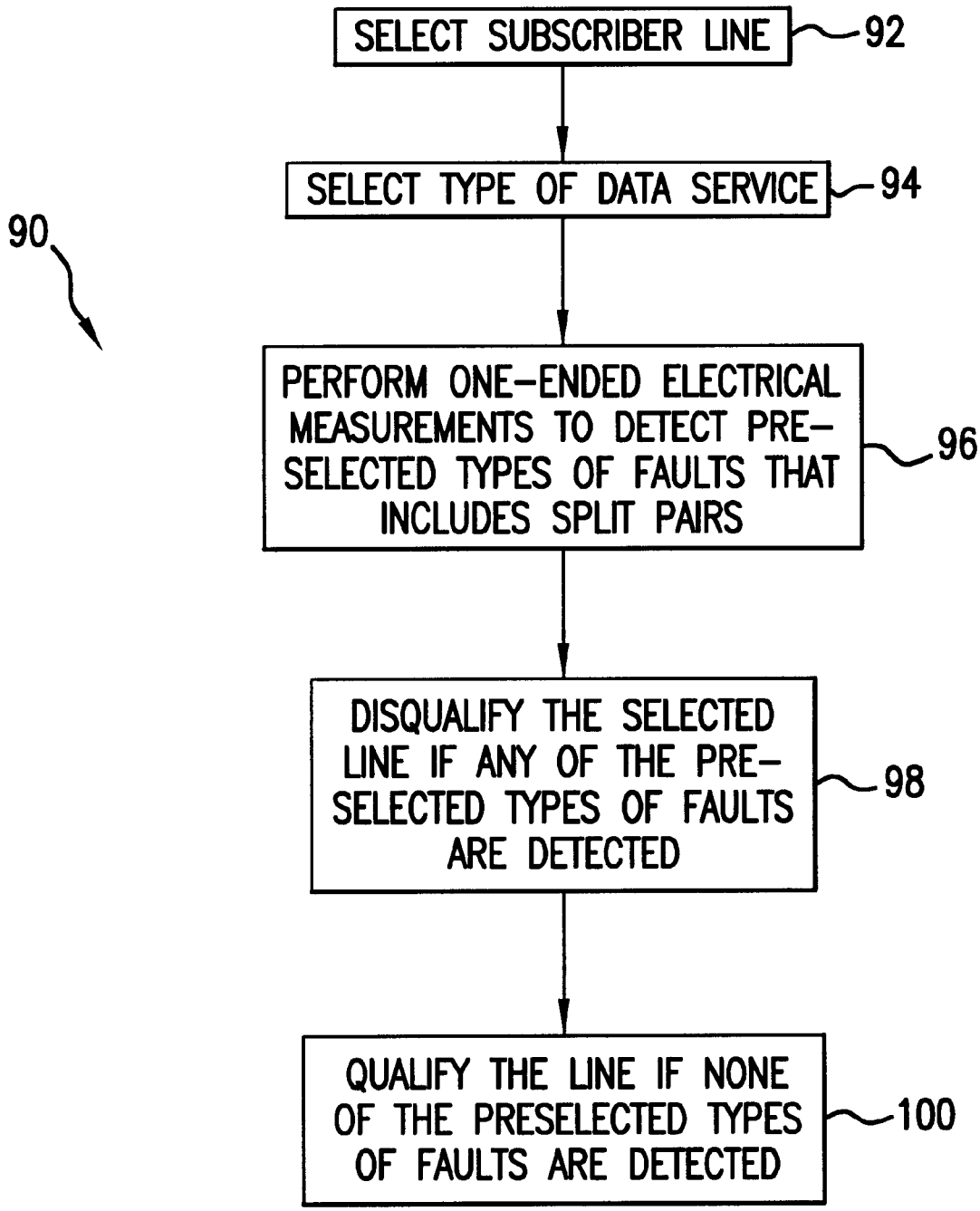
FIG. 8 is a flow chart illustrating a method of qualifying subscriber lines with the method of FIG. 7.

FIG. 8 is a flow chart illustrating a method 90 for a test that determines whether the subscriber lines 12–14 of FIG. 1 qualify or disqualify for a high-speed data service. To start a test, an operator or the computer 46 selects a subscriber line 12–14 (step 92). The operator or computer 46 also selects the type of data service for which the selected subscriber line 12–14 is to be tested (step 94). For example, the types of service may be ISDN or ADSL. After selecting the line 12–14 and service type, the measurement unit 40 performs one-ended electrical measurements to detect preselected types of faults in the selected line 12–14 (step 96). The one-ended measurements include tests according to the method 70 of FIG. 7 to detect split pairs.

The other types of line faults and conditions, which are selected for testing, depend on the types and speeds of data services, the properties of the switch 15, and the type of modem to be used. Frequently, tests check for high signal attenuations, resistive imbalances, and the presence of load coils, metallic faults, or bridged taps, because these conditions and faults can disqualify a line for high-speed data service. But, line qualification tests may also check for capacitive imbalances, and above-threshold noise levels, because these conditions can also affect qualification results. Methods and apparatus for detecting some of these conditions and faults are described in co-pending patent applications.

One such application is U.K. Patent Application No. 9914702.7, titled "Qualifying Telephone Lines for Data Transmission", by Roger Faulkner, filed Jun. 23, 1999, which is incorporated herein by reference, in its entirety. Other such co-pending applications include the above-mentioned '954 and '563 patent applications.

If one of the preselected types of faults or line conditions is detected, the computer 46 reports that the selected subscriber line 12–14 is disqualified for the selected data transmissions (step 98). Otherwise, the computer 46 reports that the selected line 12–14 qualifies for the selected data service (step 100).

To report the tested line's status, the computer 46 makes an entry in a list stored in the storage device 49. The list identifies the line, data service, and qualification or disqualification status. The computer 46 may also report is the line's status by displaying a disqualification or qualification signal on the display screen 47 visible to an operator.

Figure 9:
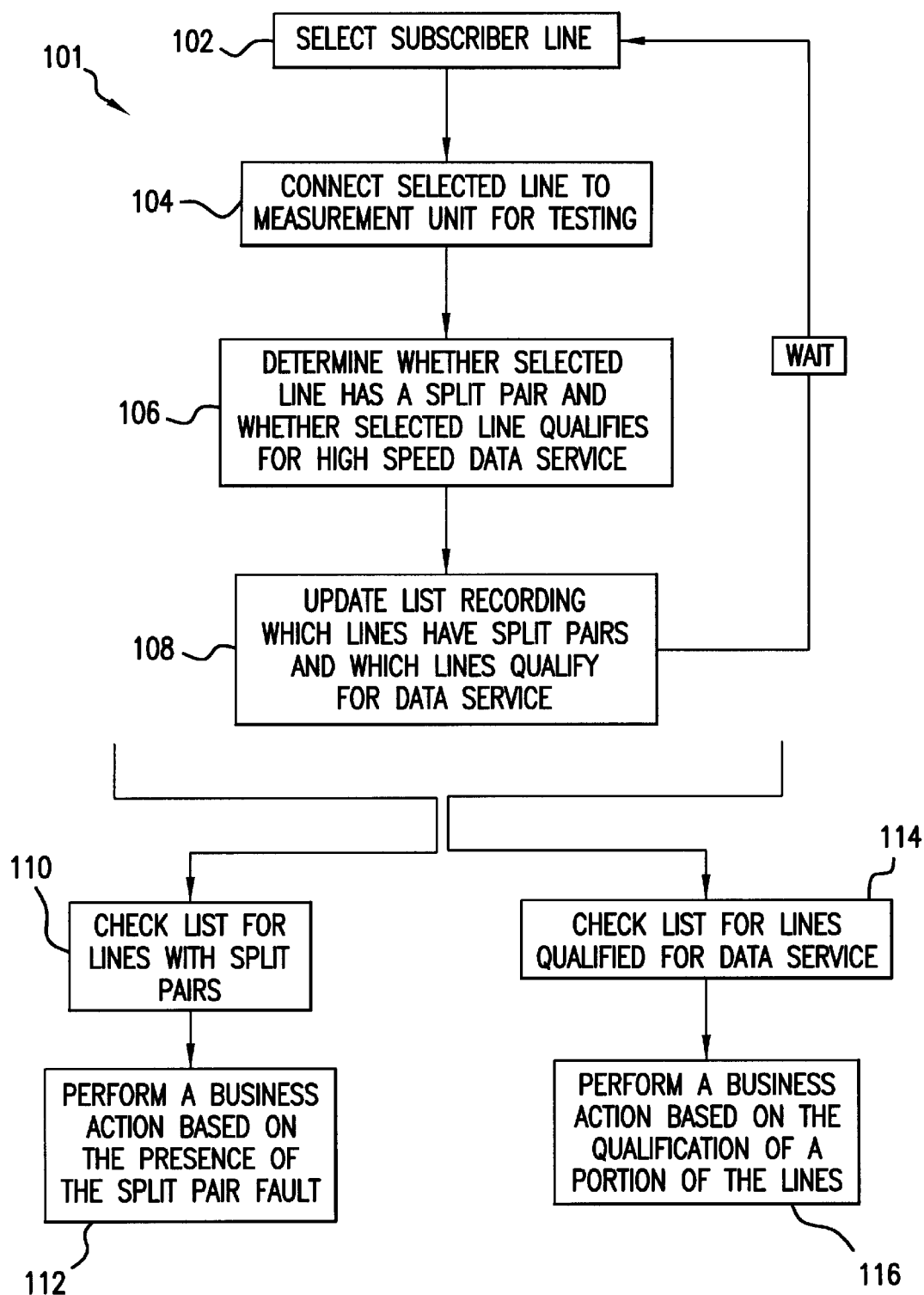
FIG. 9 shows a method of providing high speed data services using the methods of FIGS. 7 and 8.
Figure 10A:
FIGS. 10A–10E show exemplary subscriber lines having different gauge mixes.
Figure 10B:
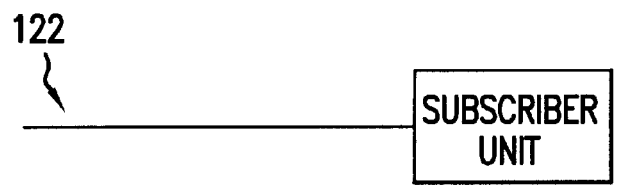
Figure 10C:
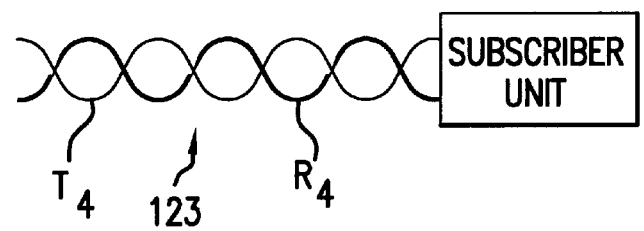
Figure 10D:
Figure 10E:
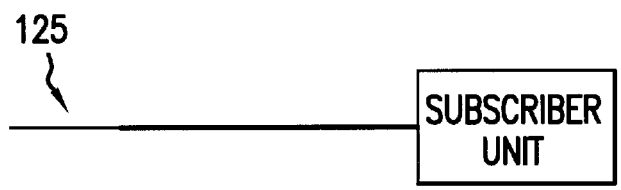

FIG. 9 is a flow chart for a method 101 used by a TELCO to provide a high-speed data service, e.g., ISDN or ADSL, to telephone subscribers. The TELCO programs the computer 46 of FIG. 1 to automatically select individual subscriber lines 12–14 connected to the local switch 15 (step 102). In response to selecting the line 12–14, the voice test access 44 connects the selected line 12–14 to the measurement unit 40 for testing (step 104). The measurement unit 40 connects the selected line 12–14 to the measurement device 41 and may also connect the selected line 12–14 to other internal measurement devices (not shown). The computer 46 and measurement unit 40 determine whether the selected line 12–14 has a split pair and qualifies for the data service according to the methods 70, 90 of FIGS. 7 and 8 (step 106). Next, the computer 46 updates a list recording the identities of lines 12–14 that qualify and of lines 12–14 having split pairs (step 108). The computer 46 waits a preselected time and restarts the testing for another of the lines 12–14 at step 102.

The TELCO regularly checks the list to determine whether any of the lines 12–14 have split pairs (step 110). If a line has a split pair, the TELCO performs a business action based on the presence of the split pair fault (step 112). The business action may include sending a worker to repair or replace the affected line 12–14, designating the affected line 12–14 as unable to transmit data, or setting a lower billing rate based on the presence of the fault.

The TELCO also regularly checks the list to determine whether any of the lines 12–14 qualify for the high-speed data service (step 114). In response to finding that one or more of the lines 12–14 qualify, the TELCO performs a business action related to the line's qualification (step 116). For example, the TELCO may offer the high speed data service to subscribers who have the lines 12–14 qualified for the data service and who do not presently subscribe to the data service.

Specific Physical Structure of Subscriber Lines

Referring again to FIG. 1, the subscriber lines 12–14 may have widely different physical structures. A line's specific physical structure is described by properties such as line length, gauge or gauges, and content of bridge taps. Interpretations of electrical measurements to obtain line transmission properties such as the signal attenuation are dependent upon the specific physical line structure. Thus, knowing the specific physical structure of a subscriber line aids in predicting how well the line 12–14 will support high speed digital data services, e.g., to predict maximum data speeds.

FIGS. 10A–E illustrate parameters that describe gauge mix parameters through exemplary lines 121–125 in which drawing widths represent wire gauges. The lines 121, 122 have uniform structures described by different wire gauges. The lines 124, 125 have segmented structures in which adjacent segments have different wire gauges, i.e., mixtures of gauges. The gauge composition of these lines 124, 125 is described by segment lengths and segment gauges. The structures are also described by the serial layout of the segments. The line 123 has different tip and ring wires $T_4$, $R_4$ and is described by the gauges of the $T_4$ and $R_4$ wires.

Figure 11:
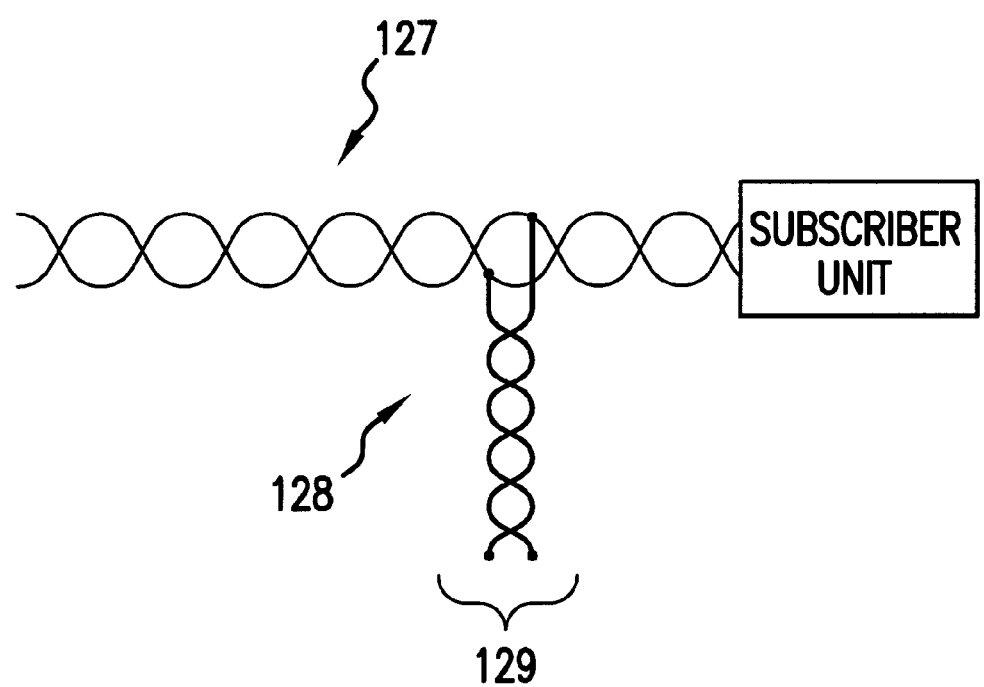
FIG. 11 shows a subscriber line with a bridged tap.
Figure 12A:
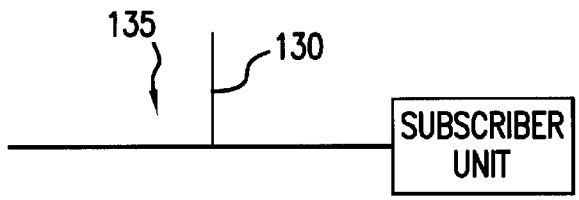
FIGS. 12A–12E shows exemplary structures of subscriber lines having one bridged tap.
Figure 12B:
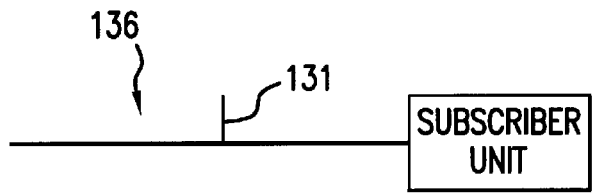
Figure 12C:
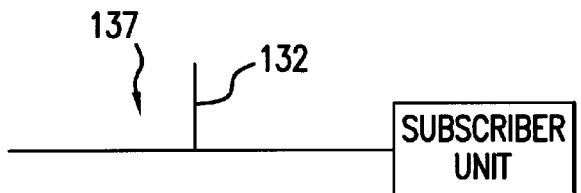
Figure 12D:
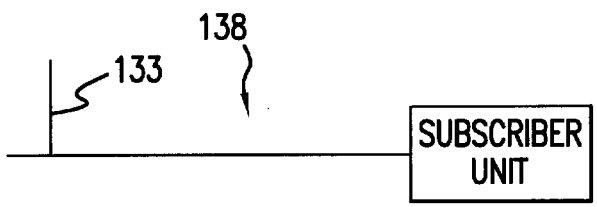
Figure 12E:
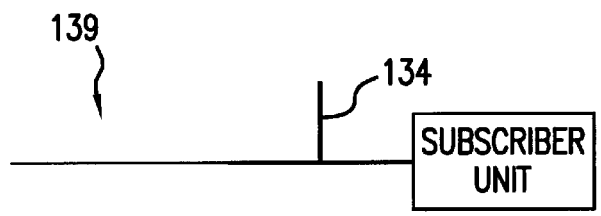

Referring now to FIG. 11, a subscriber line 127 has an extra twisted wire pair 128 spliced onto the line 127. The spliced on wire pair 128 is referred to as a bridged tap. The existence or absence of bridged taps is a parameter that also influences how well the subscriber line 127 will support high-speed digital data services.

In the United States, many subscriber lines have bridged taps because of the way in which telephone lines were laid out in housing subdivisions. Telephone lines were laid out prior to determining the exact positioning of the houses of the subdivisions. The lines ran near planned positions of several houses. When the houses were later built, the builder connected the telephone units to the nearest point on one of the originally laid telephone lines. Unconnected portions of the original lines produced bridged taps.

The bridged tap 128 reflects signals from termination 129. The reflected signals then travel back to the subscriber line 127 and interfere with signals on the subscriber line 127. The most harmful interference occurs when the reflected signal is out of phase with the incoming signal. In such a case, the reflected signal destructively interferes with the incoming signal on the subscriber line 127.

The length of the bridged tap 128 determines the phase difference between the original and reflected signals. For high-speed digital signals whose frequencies extend to about 1 mega Hetz (MHz), e.g., ADSL signals, a substantial cancellation can occur if the bridged tap 128 has a length between about 200 to 700 feet. In the United States, the bridged taps left over from the construction of many housing subdivisions have lengths in this range. Thus, the ability to detect and remove the bridged tap 128 is useful to TELCO's that want to offer high-speed digital data services to their subscribers.

FIGS. 12A–12E illustrate structure parameters that describe bridged taps 130, 134 through exemplary subscriber lines 135–139. The lines 135, 136 have bridged taps 130, 131 described by different physical lengths. The lines 137–138 have bridged taps 132, 133 described by different locations along the lines 137, 138. The line 139 has a bridged tap 134, which is at least partially described by its location along a particular segment of the line 139. Finally, the lines 136, 139 have bridged taps 131, 134 described by different gauges.

To determine the specific physical structures of unknown subscriber lines, a reference set of model lines may be employed. A reference set is an ensemble of model lines with different and known specific physical structures. To determine the specific physical structure of an unknown subscriber line, measured properties of the unknown line are compared to the same properties in model lines. If a match is found, the unknown line has the same specific physical structure as the matching model line.

Reference data on the specific physical structures of the model lines may be compiled in either a reference data file or a set of reference equations. Both the reference data file and the set of reference equations index the individual model lines by values of a preselected set of measurable electrical properties. In some embodiments, the preselected electrical properties are the frequency-dependent admittances measurable with the device 43 of FIG. 2C.

The content of model lines in the reference set may be tailored to the expected structures of the unknown subscriber lines. For example, if the unknown lines do not have bridged taps, the reference set might not have model lines with bridged taps. On the other hand, if the unknown lines may have bridged taps, the reference set includes some model lines with bridged taps. Knowledge of the practices used to lay out the subscriber lines under test can help to determine the best content of model lines for the reference set. For different subscriber line populations, reference sets can be selected empirically or based on human knowledge.

Typically, the reference set includes model lines having uniformly varying values of the parameters described in relation to FIGS. 10A–10E and 12A–12E. The model lines have a distribution of lengths and may include one, two, or three segments with zero, one, or two bridged taps, and a distribution of subscriber termination loads. The segments and bridged taps can have varying lengths, locations, and gauges.

Figure 13:
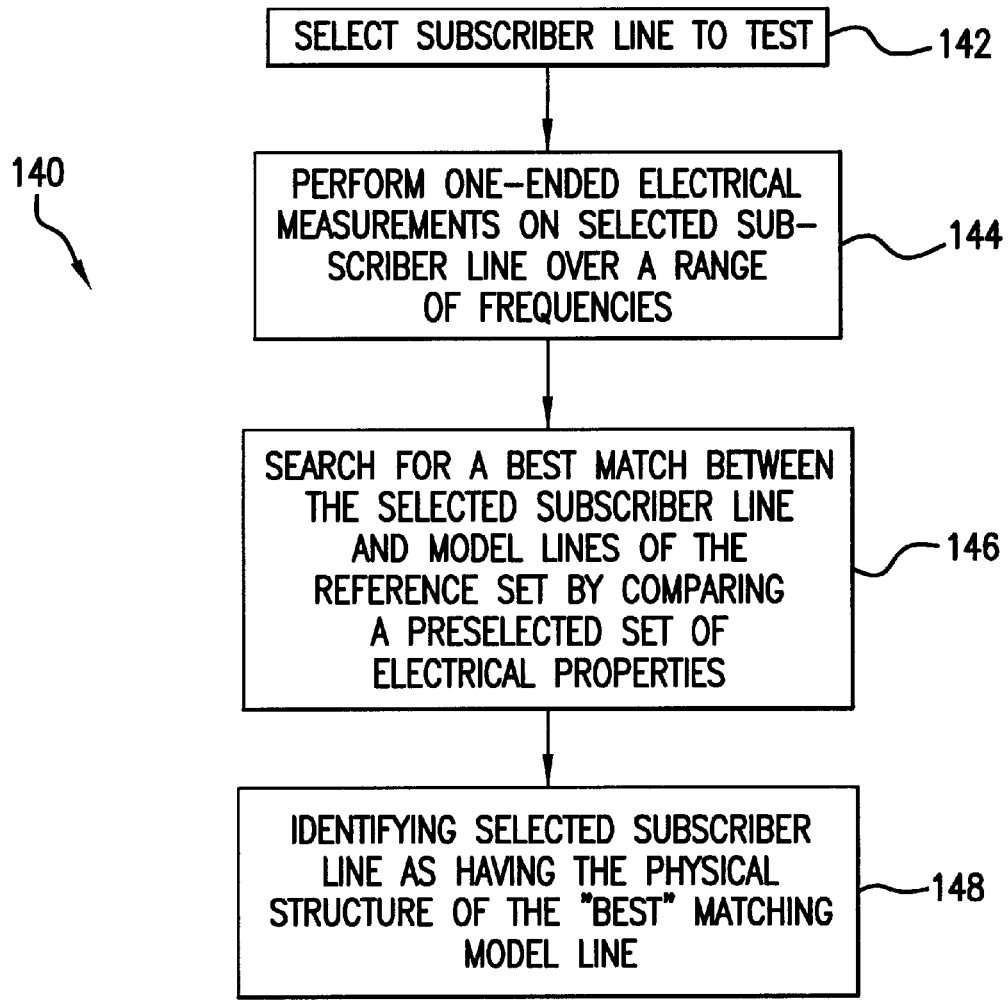
FIG. 13 is a flow chart for a method of determining the specific physical structure of a subscriber line from a reference set.

FIG. 13 is a flow chart for a method 140 of determining the specific physical line structure of the subscriber lines 12–14 of FIG. 1 from a reference set of model lines. To start, an operator or the computer 46 selects a subscriber line (ssl) to test (step 142). The computer 46 directs the measuring unit 40 to perform preselected one-ended electrical measurements on the selected subscriber line over a range of frequencies (step 144).

In one embodiment, the electrical measurements are one-ended and performed with the device 43, shown in FIG. 2C. During the measurements, the voltage source 54 drives the tip and/or ring wires of the selected subscriber line 12–14 with voltage sources $V_1'$, $V_2'$. The driving frequency is swept over a range, e.g., from about 100 Hetz to about 20,000 to 40,000 Hetz, and one or more of the admittances $Y_{tg}$, $Y_{tr}$, $Y_{rg}$ are measured for various driving frequencies. The measurements provide complex input admittances, i.e., amplitudes and phases for a preselected set of frequencies "f".

After performing the measurements, the computer 46 searches for a "best" match between model lines belonging to the reference set and the selected subscriber line (step 146). The search for matches involves comparing preselected electrical properties of the selected subscriber line to the same properties for the model lines. For the selected subscriber line, the values of the preselected electrical properties are obtained from the one-ended electrical measurements. For the model lines, the values of the same electrical properties are either looked up from a file in the data storage device 49 or calculated from a set of reference equations. The comparison determines which model line "best" matches the selected subscriber line.

The computer 46 identifies a specific physical line structure for the selected subscriber line 12–14 has the same form as the specific physical line structure of the "best" matching model line (step 148). Identifying the specific physical line structure may include reporting the structure, e.g., displaying values of parameters for the specific physical structure to a operator, writing the values to a file, or providing the values to a software application. For example, the software application may use the match information to qualify or disqualify the selected line 12–14. The parameters may provide gauge mixtures and tap locations and positions.

For the model lines, the specific physical structures are either stored in the same file listing the electrical properties of the model lines or determined from the reference equations. Actual values of the electrical properties and structure parameters of the model lines are obtained prior to testing the subscriber line by analytic calculations or experimentation.

In a preferred embodiment, the computer 46 finds the "best" matching model line by calculating an error function for each model line (ml). The error function has one of two forms E or E' given by:

$$E=\Sigma_f W(f)|M_{ml}(f)-M_{ssl}(f)| \text{ and } E'=\Sigma_f W(f)|M_{ml}(f)-M_{ssl}(f)|^{2Q}.$$

$M_{ml}(f)$ and $M_{ssl}(f)$ are the values of the preselected frequency-dependent electrical properties of the model line (ml) and the selected subscriber line (ssl), respectively. Q and W(f) define the form of the error functions, i.e., E or E'. Q is a fixed integer, e.g., 1 or 2. W(f) is positive definite weight function, e.g., a function of frequency "f" or a constant.

In some embodiments, the preselected electrical properties $M_{ml}(f)$, $M_{ssl}(f)$ are the phases of one or more complex admittances of the lines ssl, ml. Various embodiments employ either the phase of the tip-to-ground admittance $Y_{tg}$, the phase of the ring-to-ground admittance $Y_{rg}$, and/or the phase of the tip-to-ring admittance $Y_{tr}$. If the tip-to-ground or ring-to-ground admittances $Y_{tg}$, $Y_{rg}$ are used, many termination effects due to the subscriber units 16–18 of FIG. 1 are not seen. The phase of these admittances is often small, e.g., 4° or less, and approximately equals the ratio of the imaginary to real parts of the admittance. For such a case and Q=1, the error function E' is:

$$E'=\Sigma_f[Im(\text{admittance})_{ml}/Re(\text{admittance})_{ml}-Im(\text{admittance})_{ssl}/Re(\text{admittance})_{ssl}]^2.$$

In another embodiment, the preselected electrical properties $M_{ml}(f)$, $M_{ssl}(f)$ are the full complex admittances of the lines ssl, ml, i.e., $Y_{tg}$, $Y_{rg}$, and/or $Y_{tr}$. Using the complex admittances themselves can reduce computational times.

Finally, in some embodiments, the best match to the selected subscriber line 12–14 may include a several different model lines, e.g., model lines generating errors with a below threshold value. In these embodiments, the computer 46 identifies the selected subscriber line 12–14 as having one or more common features of all of the "best matching" lines. For example, the computer 46 may identify the specific physical structure of the selected subscriber line 12–14 as having a bridged tap if all of the best matching model lines have a bridged tap. Then, the computer 46 may use the presence of a bridged tap in combination with other measurements to qualify or disqualify the line 12–14.

Figure 14:
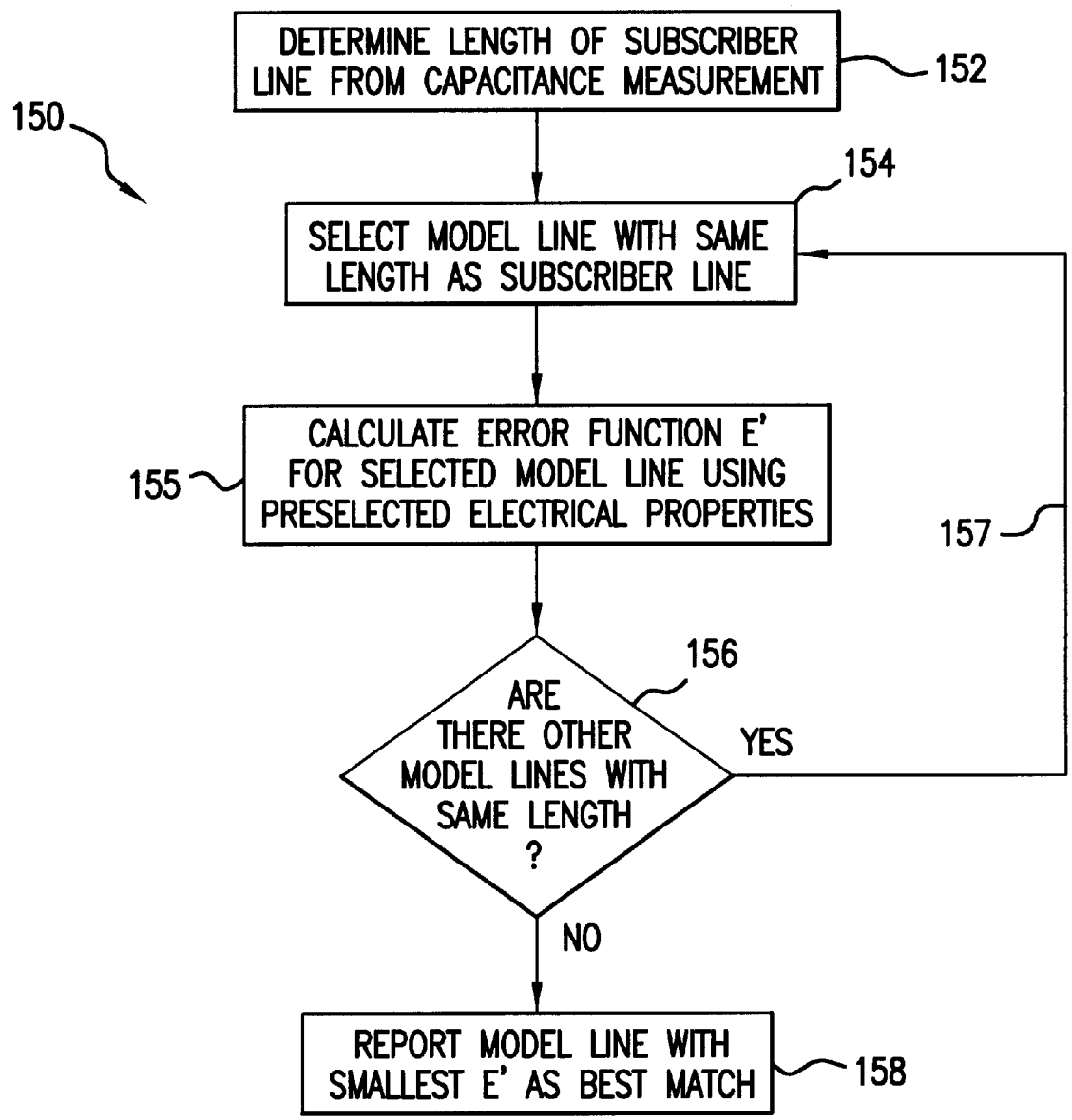
FIG. 14 is a flow chart for a method of finding a best match between a subscriber and model lines.

FIG. 14 illustrates a method 150 of determining "best" matches by using the above-described phases. The computer 46 determines the length of the selected subscriber line using low frequency measurements for line capacitance performed by the measurement unit 40 and device 43 (step 152). Next, the computer 46 selects a model line having the same length as the selected subscriber line (step 154).

The computer 46 restricts comparisons to model lines with the same length as the subscriber line, because physical line length affects the values of the phases of admittances. Limiting comparisons to this subset of the reference set eliminates false matches with model lines whose lengths differ from the length of the selected subscriber line.

The computer 46 calculates the error function E', based on the phase of preselected admittances, for the selected model line (step 155). The computer 46 checks whether other model lines remain with the same length (step 156). If other lines remain, the computer 46 repeats the determination of E' for another selected model line (157). If no lines remain, the computer 46 reports the model line having the smallest value for the error function E' as the "best" match to the selected subscriber line (step 158).

Since the reference set may contain as many as 10,000 to 100,000 model lines, the method 150 may search the reference set hierarchically to reduce the total number of searches. In a hierarchical scheme, a first search divides the reference set into non-overlapping groups of model lines. Each group has a large number of lines with similar specific physical structures and defines one model line as a representative of the group. The first search uses the method 150 to determine a "best" match between the selected subscriber line and one of the representative model lines. A second search uses the method 150 on the model lines of the group associated with the best matching representative model line found from the first search.

Figure 15:
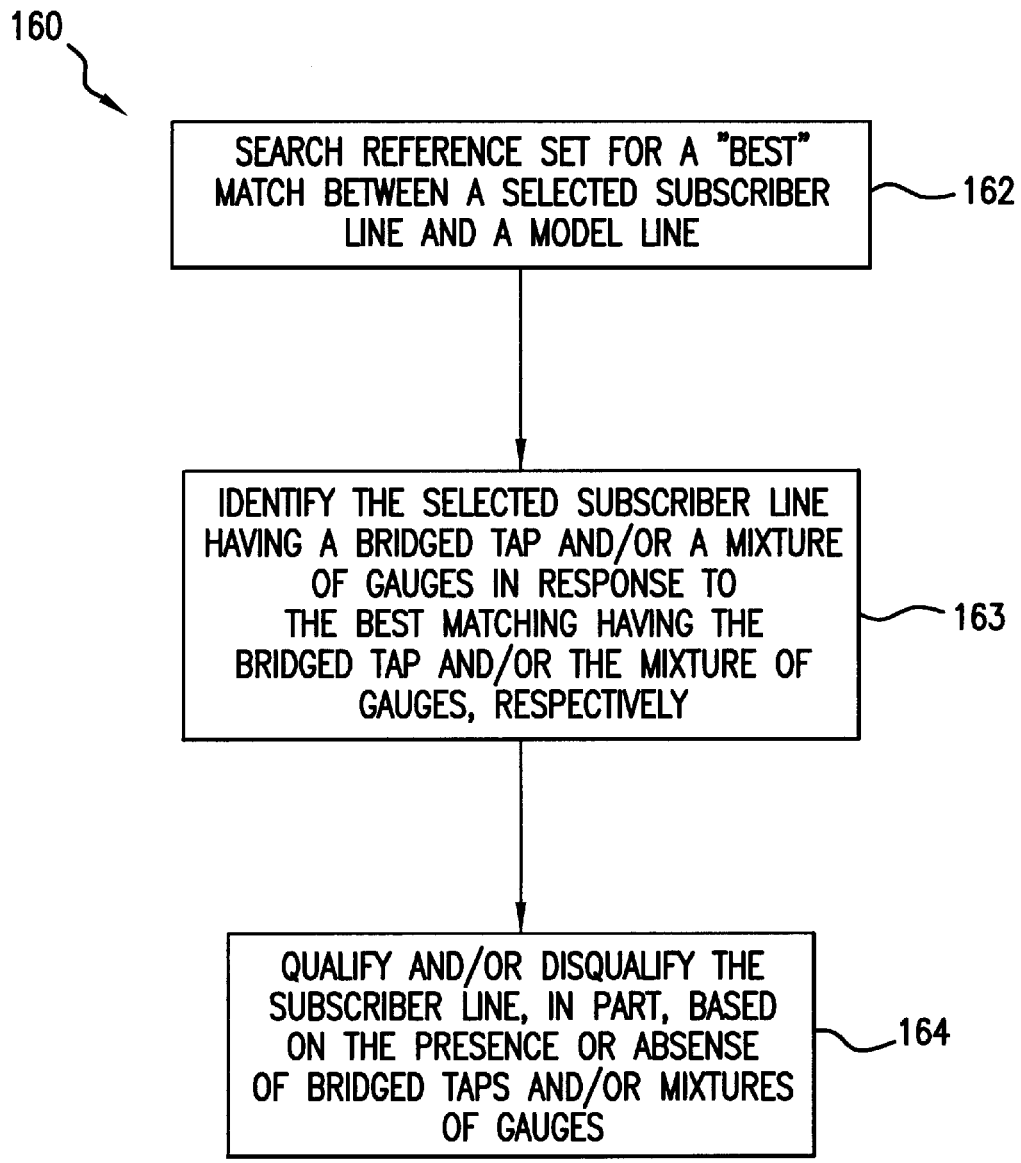
FIG. 15 is a flow chart for a method of qualifying subscriber lines.

FIG. 15 is a flow chart illustrating a method 160 of qualifying subscriber lines, e.g., lines 12–14 of FIG. 1, for a high-speed data service, e.g., ISDN or ADSL. After selecting a subscriber line to test, the computer 46 searches a reference set of model lines for a "best" match to the selected subscriber line by using the methods 140, 150 of FIGS. 13 and 14 (step 162). The computer 46 identifies the selected subscriber line as having a bridged tap or mixture of gauges in response to the "best" match model line having a bridged tap or mixture of gauges, respectively (step 163). The computer 46 qualifies or disqualifies the selected subscriber line for the data service, at least in part, based upon whether the subscriber line has a bridged tap or mixture of gauges (step 164).

In some embodiments, the computer 46 uses the signal attenuation to qualify or disqualify the selected subscriber line according to a method described in co-pending U.S. application Ser. No. 08/294,563 ('563). In those embodiments, the computer 46 calculates the signal attenuation by the methods described in the '563 application. Then, the computer 46 adjusts the calculated value of the signal attenuation up or down depending on a quality factor. The quality factor depends on the specific physical structure of the line, e.g., upon whether a bridged tap and/or a mixture of gauges is absent or present in the subscriber line.

According to the value of the quality factor, the computer 46 adjusts a calculated signal attenuation up or down by preselected amounts. For example, the attenuation may be decreased, unchanged, and increased in response to the quality factor being good, average, and poor, respectively. Then, the computer uses the adjusted signal attenuation to determine to qualify or disqualify the subscriber line for the data service according to methods described in the '563 application.

In other embodiments, the computer 46 uses some specific physical line structures as disqualifiers. For example, if the above-described methods lead to the detection of a bridged tap, the computer 46 may disqualify the line for the data service.

Figure 16:
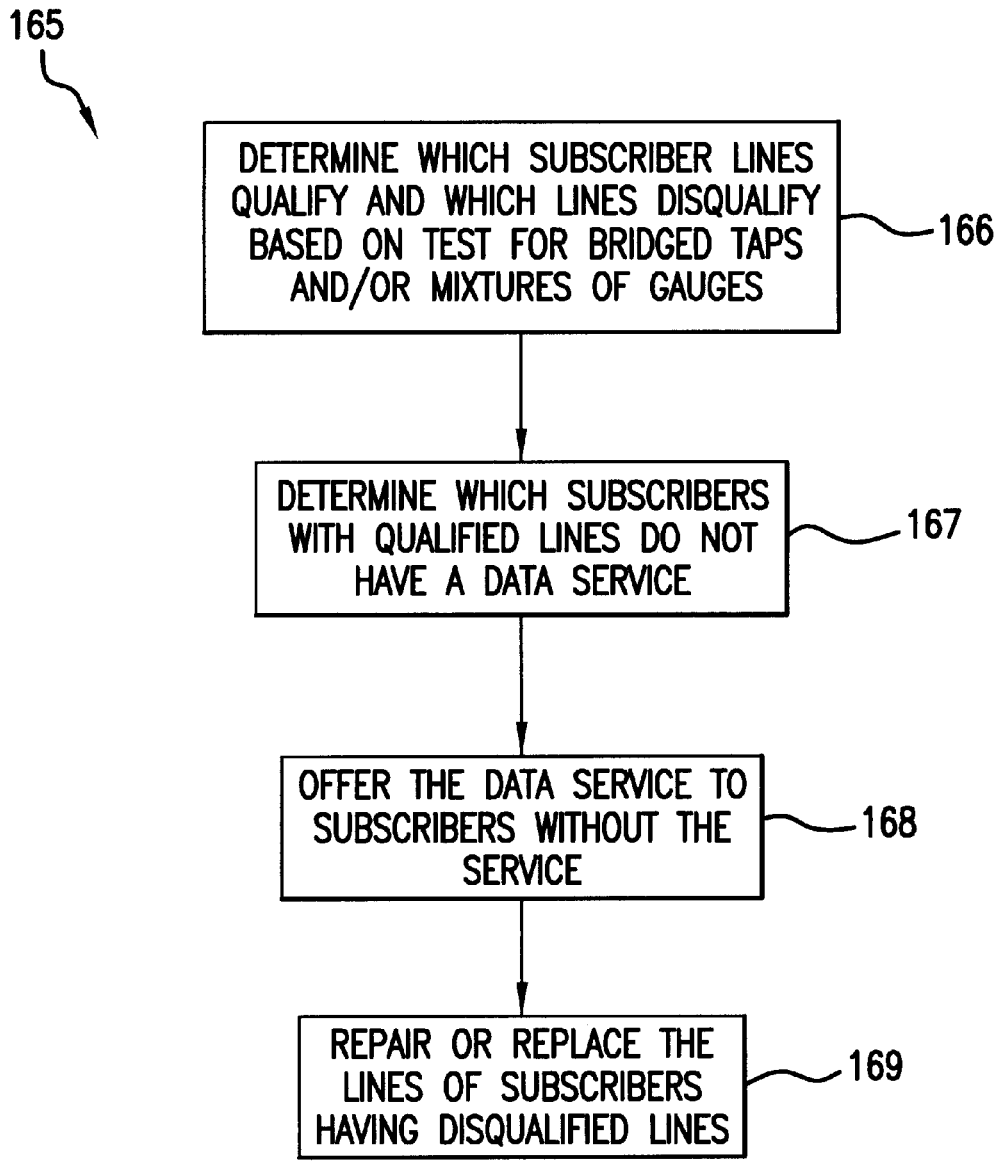
FIG. 16 is a flow chart for a business method of providing high-speed data services to subscribers.

FIG. 16 is a flow chart illustrating a business method 165, which a TELCO uses to provide a high-speed data service to subscribers. The TELCO determines which subscriber lines 12–14 of FIG. 1 are qualified and/or disqualified for the data service according to the method 160 of FIG. 15 (step 166).

Using the method 160, the computer 46 determines whether line structures, e.g., bridged taps and/or selected mixtures of gauges, are present. The specific physical structure is then used to adjust predictions of electrical properties of the subscriber line, e.g., a signal attenuation. If the adjusted values of the electrical properties are outside of thresholds for the data service the line is disqualified.

Among subscribers with qualified lines 12–14, the TELCO determines which subscribers having qualified lines do not subscribe to the data service (step 167). The TELCO offers the data service to subscribers having qualified lines and not presently subscribing to the service (step 168).

In response to finding subscribers with disqualified lines 12–14, the TELCO repairs or replaces those lines 12–14 (step 169).

Stacked Bridged Tap Detection

Referring again to FIG. 1, tests for bridged taps preferably use one-ended electrical measurements that are performed on subscriber lines 12–14 via the "standard" voice test access 44. The voice test access 44 acts as a low pass filter, which screens out frequencies above 20 to 100 KHz. Thus, electrical measurements are generally restricted to low frequencies between about 20 Hz and 100 KHz.

Bridged taps manifest their presence by peaks in the signal attenuation at high frequencies, e.g., between about 200 KHz and 1,000 KHz. Predicting features of the high-frequency signal attenuation from the low-energy measurements, which are available through the voice test access 44, is difficult and error prone. Present methods falsely predict the presence or absence of bridged taps in about 40% of the cases. False predictions are costly to subscribers and TELCO's, because they can result in lost opportunities for high-speed data services and can also result in investments in transmission equipment that lines do not support.

The accuracy of tests for line conditions and faults, e.g., bridged taps, can be improved with stacked generalization methods that use multiple layers of classifiers. The classifiers determine values of auxiliary variables, which are the labels they assign to classify subscriber lines 12–14. Auxiliary variables are generated as outputs of classifiers. The auxiliary variables are thus, related to electrical measurements on the lines 12–14 indirectly through probabilistic relations embodied in the classifiers. The classifiers of the stack may be decision trees, neural networks, case-based reasoners, or statistically based classifiers. The old electrical properties and new auxiliary variables can be combined in classifiers that provide strong correlations between values of these quantities and the presence or absence of line faults and conditions, such as bridged taps and gauge mixtures.

Figure 17:
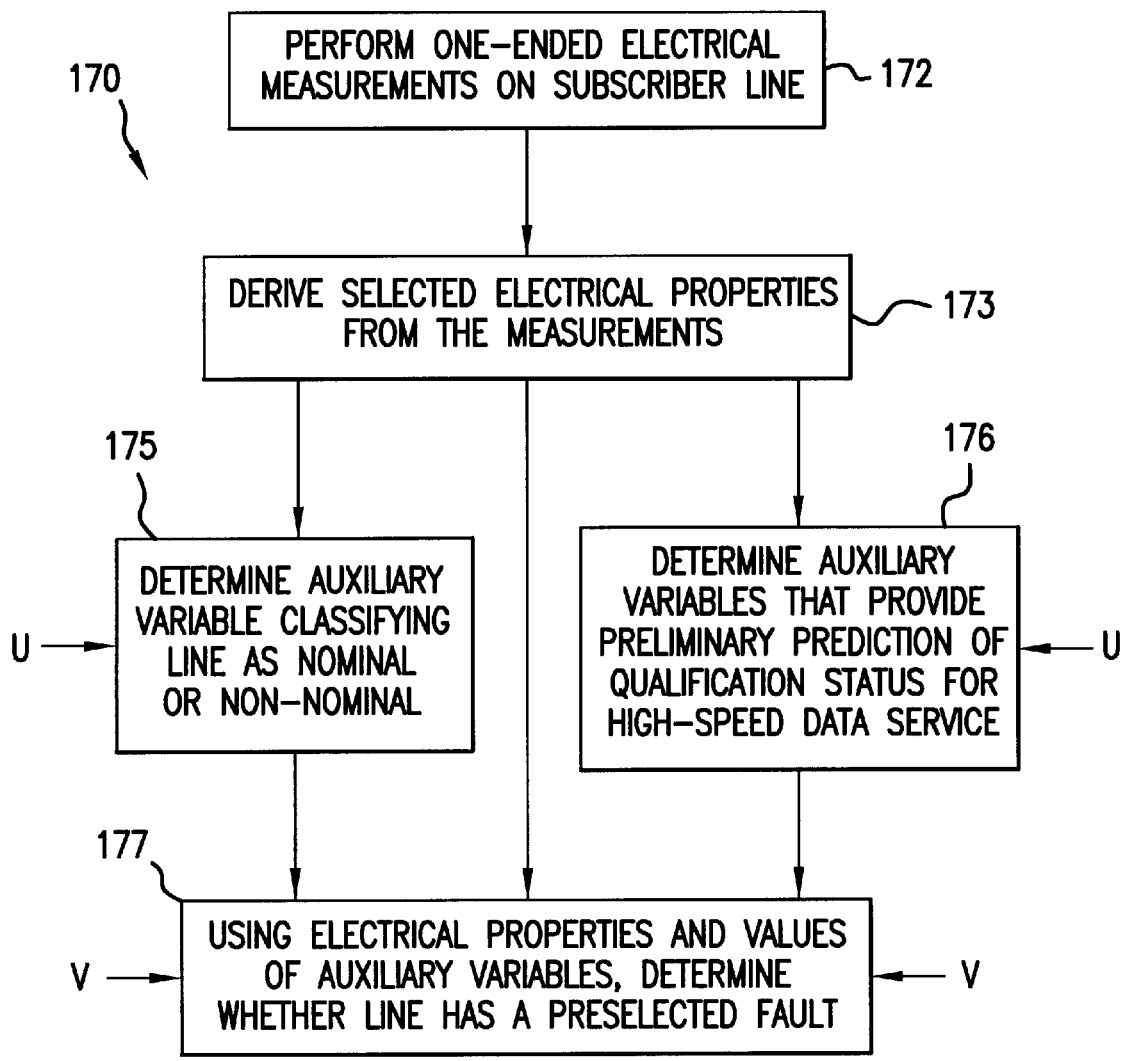
FIG. 17 is a flow chart for a stacked method of detecting bridged taps using auxiliary variables.

FIG. 17 is a flow chart illustrating a method 170 for using stacked classifiers to detect selected line conditions or faults from electrical measurements made with the system 11 of FIG. 1. The system 11 preferably performs one-ended electrical measurements on a selected subscriber line 12–14 using either setup 52 or setup 60, shown in FIGS. 2A–2C, 3 (step 172). To these measurements, the computer 46 applies a set of rules that define a preselected set of derived electrical properties for the selected line 12–14 (step 173). Algebraic relations relate the derived properties to the measurements. The measured and derived electrical properties are listed in Appendix A.

The measured and derived properties together form the input properties for the stack of classifiers. These input properties may include a preliminary value of the signal attenuation, the line length, line impedances, and ratios of line impedances. The selection of the input line properties for the stack can be changed to accommodate different expected compositions of the subscriber lines 12–14 being tested.

In each layer U, V of classifiers, shown in FIG. 17, the computer 46 determines values of one or more auxiliary variables for the selected line 12–14. The auxiliary variables may be logic-type variables indicating that the line 12–14 is labeled by a characteristic. The auxiliary variables may also be probability-type variables each indicating the likelihood that the line 12–14 is labeled by one of a plurality of characteristics.

In the first layer U of the stack, the computer 46 applies a first classifier to input electrical measurements and properties to determine a first auxiliary variable (step 175). The first auxiliary variable characterizes the line 12–14 with a label "nominal" or a label "non-nominal".

In a nominal line, low frequency properties provide a good prediction of the signal attenuation at the high frequencies where bridged taps strongly affect attenuation. Thus, knowing a value of an auxiliary variable that labels a line as nominal or non-nominal can improve the accuracy of predictions about the presence of line faults like bridged taps.

Also in the first layer U, the computer 46 applies one or more second classifiers to the input electrical properties to determine one or more other auxiliary variables (step 176). These auxiliary variables provide a preliminary prediction of whether the selected line 12–14 is qualified or disqualified for one or more high-speed data services. In some embodiments, values of the auxiliary variables, found at step 176, indicate whether the subscriber line 12–14 is qualified for ISDN or ADSL data services or neither.

Disqualification for high-speed data service correlates with presence of a bridged tap, because a bridged tap lowers a line's capability to carry high-frequency signals. Thus, knowing a value of an auxiliary variable that preliminarily labels a line as qualified or disqualified for data transmissions can improve the accuracy of predictions about the presence or absence of bridged taps.

Steps 175 and 176 may be performed in parallel or sequentially. If these steps 175 and 176 are sequential, the value of the auxiliary variable output by the earlier step may be used in the later step. If step 175 is earlier, the classifier of step 176 may use the auxiliary variable labeling the line 12–14 as nominal or non-nominal, as an input. If step 176 is earlier, the classifier of step 175 may use the auxiliary variables providing a preliminary qualification or disqualification for data transmissions as inputs.

At the second layer V of the stack, the computer 46 applies a classifier to the auxiliary variables from steps 175 and 176 and the electrical measurements and properties from steps 172 and 173. This classifier determines whether the selected subscriber line 12–14 has a preselected type of line fault or condition (step 177). For example, the fault or condition may be existence of a bridged tap or a gauge mixture.

The layered stack U, V can predict the presence or absence of bridged taps with a substantially increased accuracy. The two-layered stack of FIG. 17 can predict the presence of bridged taps with an accuracy of between about 75% and 85% and the absence of bridged taps with an accuracy of greater than about 97%.

In steps 175, 176, and 177, classifiers analyze input data to determine the values of output data. Henceforth, the input data, which includes one-ended measurements, properties derived from one-ended measurements, and/or auxiliary variables, are referred to as line features. The output data, which are values of auxiliary variables, are referred to as classifying labels.

Their line features and labels can describe the classifiers of steps 175, 176, and 177. The classifier in step 175 uses the selected measured and derived electrical properties of the selected line 12–14 as features to form classes with labels "nominal" and "non-nominal". The classifier of step 176 uses the same features to form classes with labels "ISDN qualified", "ADSL qualified", or "data service disqualified" in one embodiment. The classifier of step 177 uses the same features and values of the characterizing labels from steps 175, 176 to form classes with labels "bridged tap present" and "bridged tap absent".

The label "nominal" describes a type of signal attenuation over a range that includes both low measurement frequencies and high data service frequencies. For a nominal line, the difference between actual and predicted signal attenuations AA(f) and PA(f) has a simple dependence on frequency "f". The actual signal attenuation AA is the attenuation of the line determined from direct double-ended electrical measurements. The predicted signal attenuation PA is the attenuation obtained from one-ended electrical measurements, e.g., using the system 11 of FIG. 1.

The predicted signal attenuation PA(f) may be obtained from a subscriber line's capacitance, e.g., the capacitance $C_{g_{30\,Hz}}$ between tip wire and ground measured at 30 Hz. One form for the predicted signal attenuation PA(f) is:

$$PA(f) = K(f) C^g_{30\,Hz}.$$

In this formula, K(f)=−0.1729, −0.2074, −0.2395, −0.2627, and −0.2881 dB/nano-Farads for respective frequencies f equal to 100, 200, 300, 400, and 500 KHz.

Another form for the predicted attenuation PA(f) is described in co-pending U.K. Patent Application 9914702.7.

For a nominal line, the difference, DFF(f), between the actual and the predicted signal attenuations AA(f), PA(f) has one of the following forms:

1) DFF(f)<3.5 dB for 100 KHz<f<500 KHz;
2) 3.5 dB≦DFF(f)<10.0 dB for 100 KHz<f<500 KHz; or
3) DFF(f)≧10.0 dB for 100 KHz<f<500 KHz.

If the frequency dependent difference DFF(f), i.e., |AA(f)−PA(f)|, does not have form 1, 2, or 3, the line 12–14 is classified as a non-nominal line. Thus, a direct determination of whether a particular line 12–14 is nominal requires both one-ended and two-ended measurements to obtain both PA(f) and AA(f).

Figure 18A:
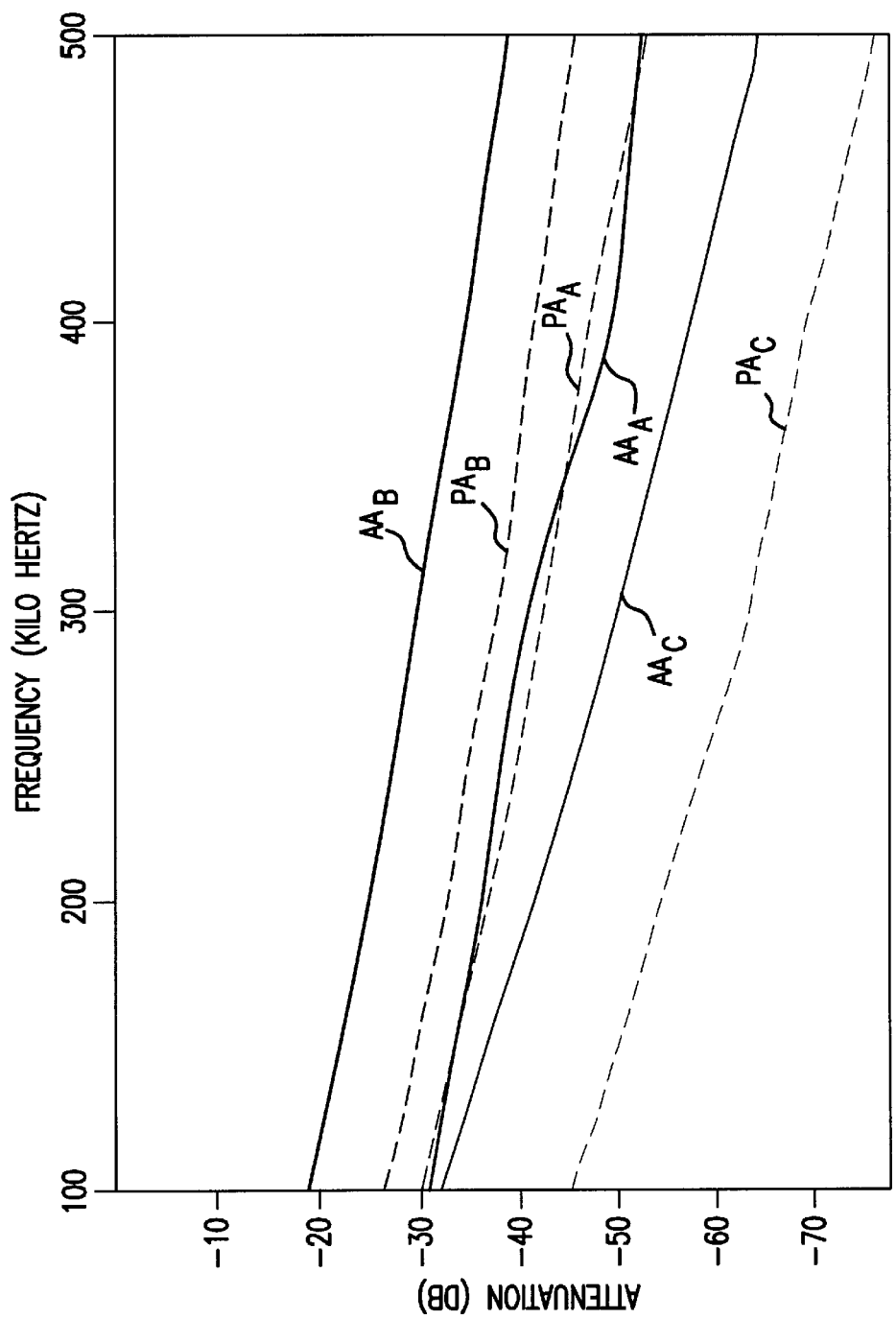
FIG. 18A shows predicted and actual signal attenuations of nominal subscriber lines.

FIG. 18A shows predicted and actual attenuations of exemplary nominal lines A, B, and C. For the line A, predicted and actual attenuations $PA_A$ and $AA_A$ differ by less than 3.5 dB for the entire frequency range between 100 and 500 KHz. The line A has a DFF(f) of form 1. For the line B, predicted and actual attenuations $PA_B$, $AA_B$ differ by between 4 and 9 dB over the 100 KHz to 500 KHz frequency range. The line B has a DFF(f) of form 2. For the line C, predicted and actual attenuations $PA_C$, $AA_C$ differ by between more than 10.0 dB over the 100 KHz to 500 KHz frequency range. The line C has a DFF(f) of form 3.

Figure 18B:
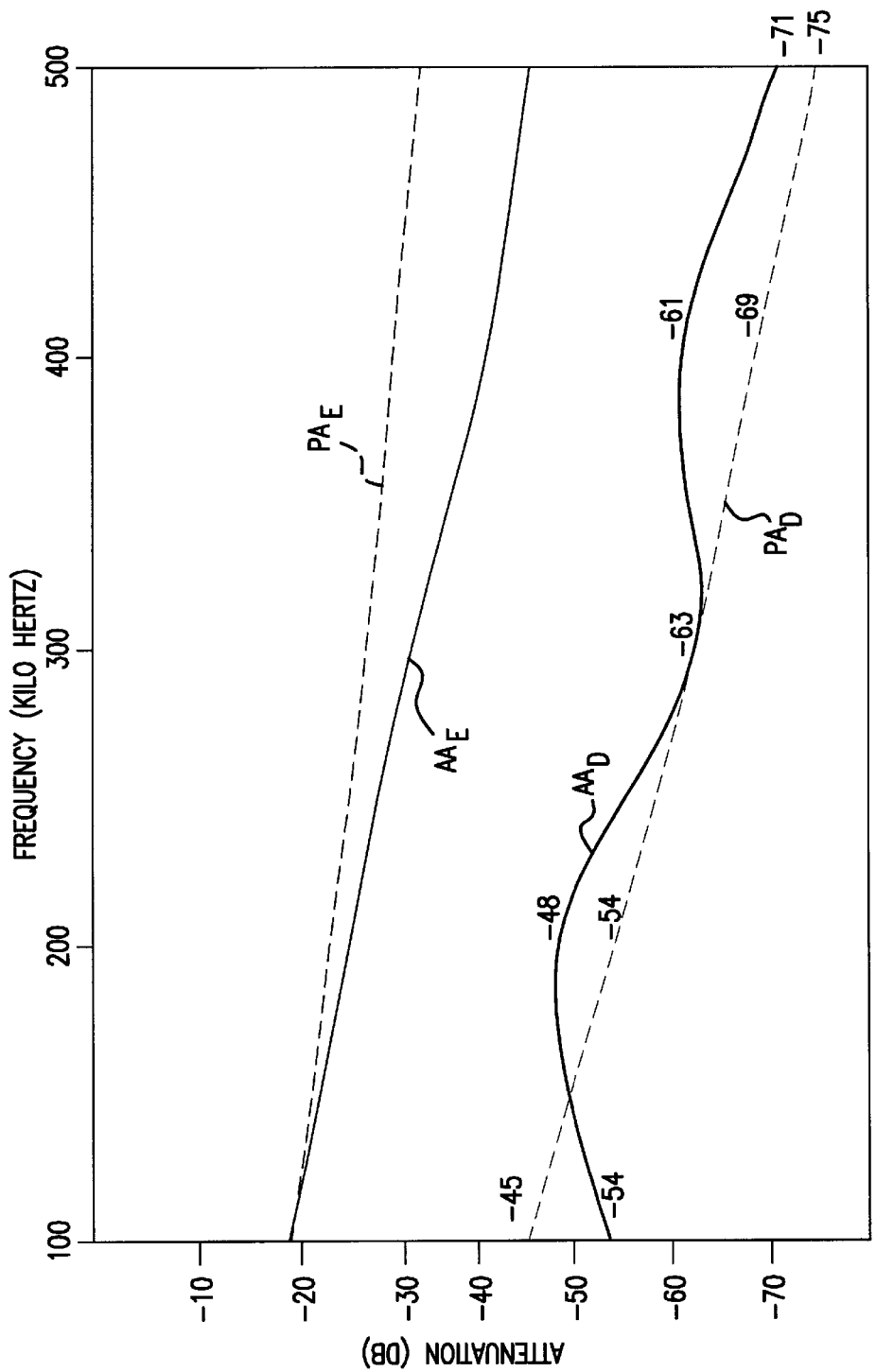
FIG. 18B shows predicted and actual signal attenuations of non-nominal subscriber lines.

FIG. 18B shows predicted and actual attenuations of exemplary non-nominal lines D and E. For the line D, predicted and actual signal attenuations $PA_D$, $AA_D$ differ by about 8 dB at 200 and 400 KHz and are equal at 150 and 300 KHz. This form for $PA_D$ and $AA_D$ does not correspond to a DFF(f) of form 1, 2, or 3. For the line E, predicted and actual signal attenuations $PA_E$, $AA_E$ differ by less than 3.5 dB at frequencies between 100 and 200 KHz and by more than 8 dB at frequencies between 400 and 500 KHz. This form for $PA_E$ and $AA_E$ also does not correspond to a DFF(f) of form 1, 2, or 3.

In the non-nominal lines D and E wide fluctuations occur in DFF(f). These fluctuations make a constant shift of the predicted attenuation PA(f) a poor approximation to the actual attenuation AA(f) over the whole range that includes both high and low frequencies.

Figure 18C:
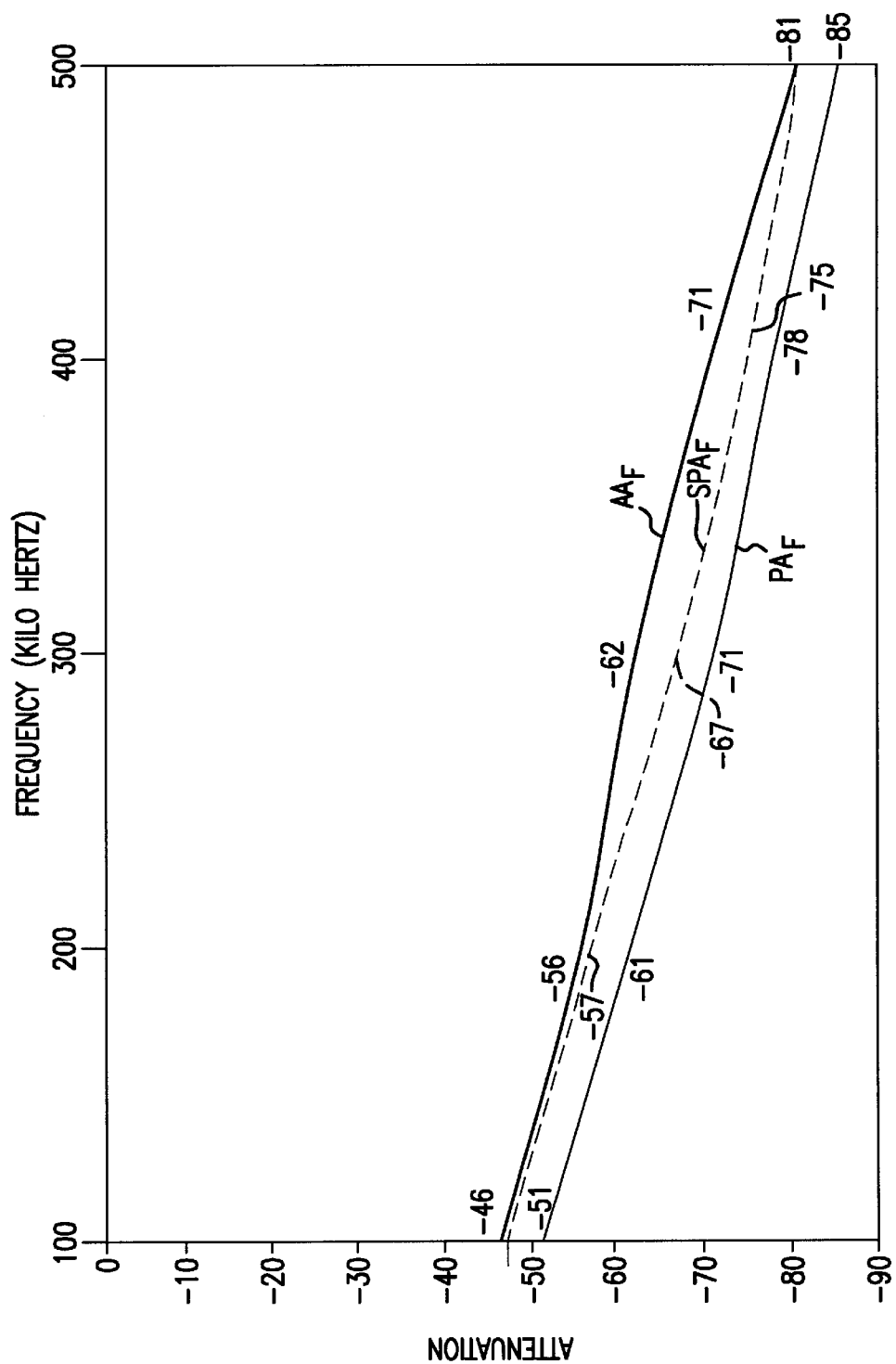
FIG. 18C shows predicted, shifted predicted, and actual signal attenuations for an exemplary nominal subscriber line.

FIG. 18C shows predicted and actual signal attenuations $PA_F$, $AA_F$ for another nominal subscriber line F. A shifted predicted attenuation $SPA_F$, which has been obtained by shifting the predicted attenuation $PA_F$ by a constant, is also shown. For the nominal line F, the shifted predicted attenuation $SPA_F$ provides a better approximation to the actual attenuation $AA_F$ that the predicted attenuation $PA_F$ over the entire range between 100 KHz and 500 KHz.

The actual and predicted signal attenuations AA(f), PA(f) of nominal lines are approximately related by a constant shift over a wide frequency range. The wide frequency range includes both low measurement frequencies and high frequencies where effects of bridged taps are directly observable.

In step 176 of FIG. 17, the labels ISDN qualified, ADSL qualified, and data service disqualified are defined by the value of the actual signal attenuation at 100 KHz and 300 KHz. High-speed data qualified and disqualified lines satisfy:

| Class Label    | 100 KHz              | 300 KHz             |
|----------------|----------------------|---------------------|
| ADSL qualified | attenuation > −47 dB | attenuation > −40   |
| ISDN qualified | attenuation > −47 dB | attenuation ≦ −40   |
| Disqualified   | attenuation ≦ −47 dB | attenuation ≦ −40   |

Thus, qualification or disqualification of a line 12–14 for ADSL and ISDN are defined by the value of the actual signal attenuation at two high frequencies, i.e., 100 KHz and 300 KHz.

Figure 19:
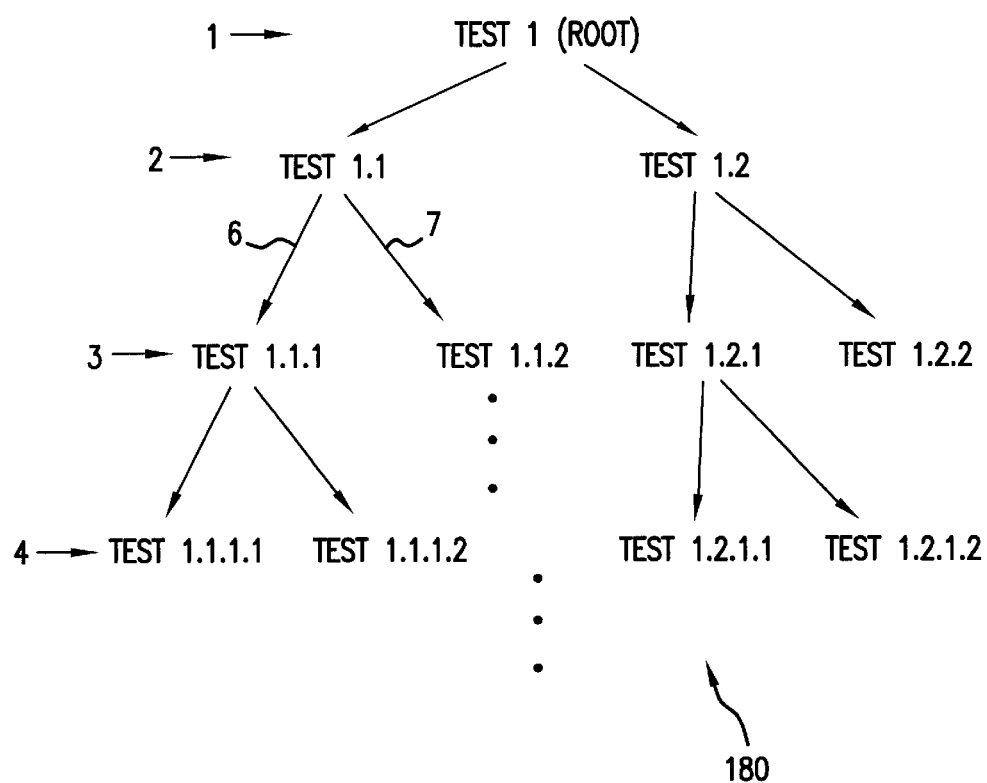
FIG. 19 shows an exemplary decision tree.

FIG. 19 illustrates a decision tree 180 that determines a classifying label, e.g., an auxiliary variable, generated in steps 175–177 of FIG. 17. A separate classifier, e.g., a decision tree, is used to determine each such label.

The decision tree 180 has a hierarchical arrangement of branching tests 1, 1.1–1.2; 1.1.1–2.2.2, . . . , which are grouped into descending levels 1, 2, 3 . . . . Each test assigns feature data received from a higher level to disjoint subsets in the next lower level. The subsets of the lower level are located at ends of arrows starting at the test. For example, test 1.1 assigns feature data to subsets 1.1 and 1.2, which are located at the ends of arrows 6 and 7, see FIG. 20. At the lower level, another set of tests can act on the feature data.

Figure 20:
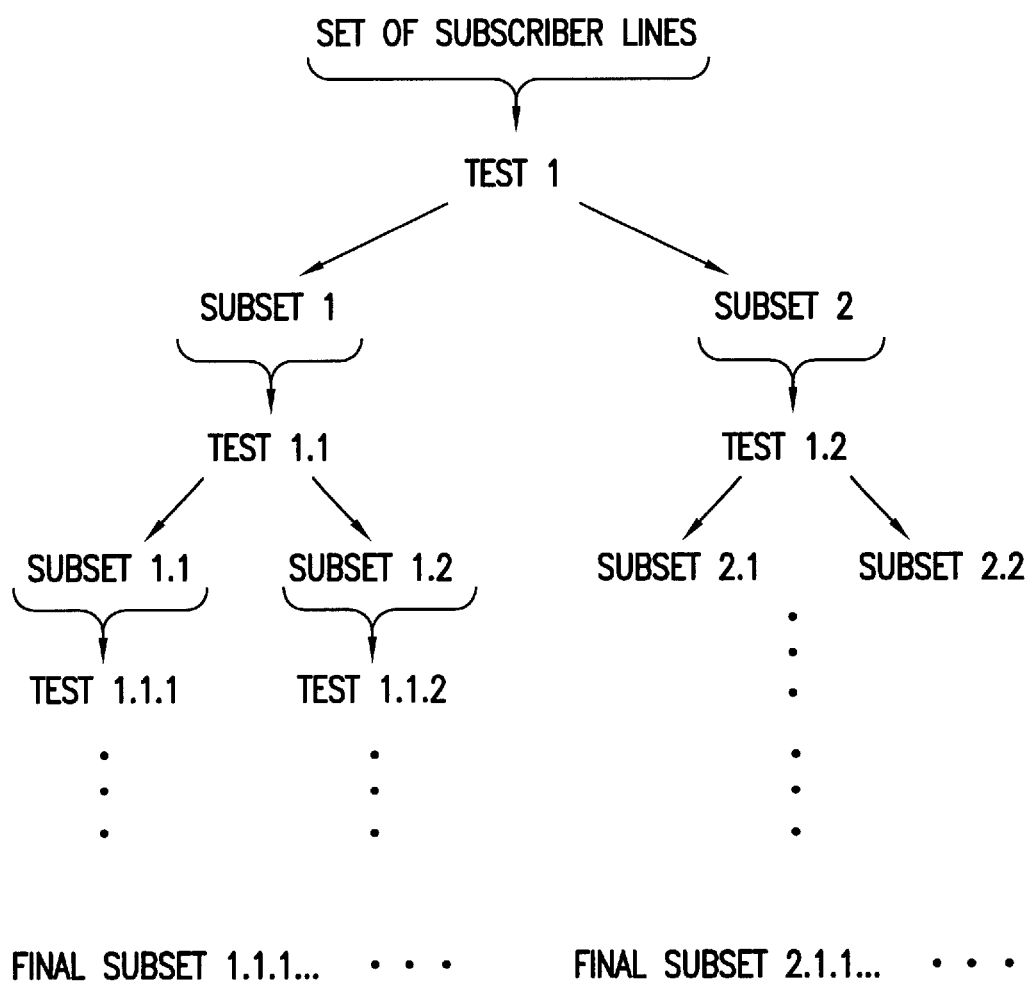
FIG. 20 illustrates the action of the rules of the decision tree of FIG. 19 on a set of subscriber lines.

FIG. 20 illustrates how the tests 1, 1.1, 1.2, . . . of the various levels of the decision tree 180 of FIG. 19 act on a set of feature data associated with the subscriber lines 12–14. Each successive test partitions the set, i.e., by using values of the selected features, into increasingly disjoint output subsets. For example, test 1 partitions the initial feature data into subset 1 and subset 2. The distal end of each path through the decision tree 180 assigns a subscriber line to a final subset in which the lines are primarily associated with one value of the classifying label of the tree 180. Some decision trees 180 determine a probability that the subscriber line 12–14 has the value of the label of the final subset to which it is assigned.

Figure 21:
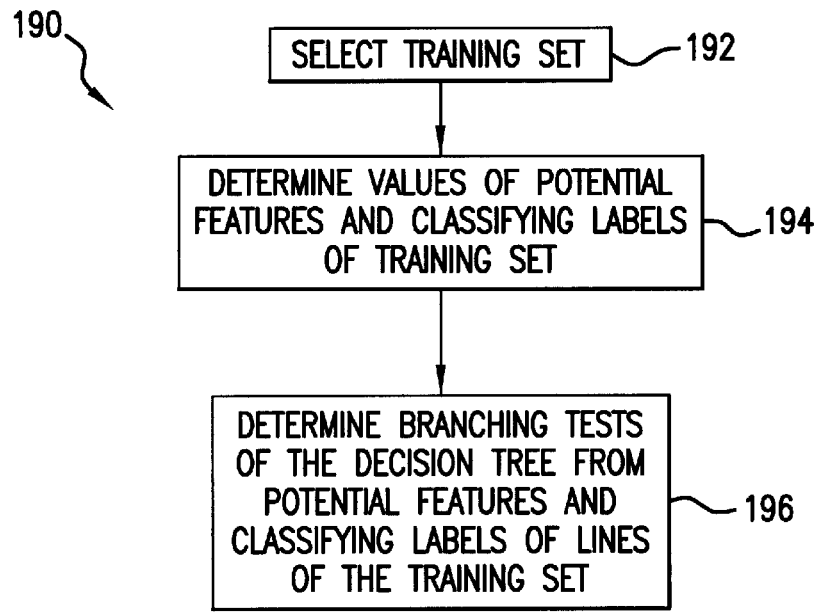
FIG. 21 is a flow chart illustrating a method of creating the decision trees with machine learning methods.

FIG. 21 is a flow chart for a method 190 of creating decision trees for use as the classifiers in steps 175, 176, and 177 of FIG. 17. The method 190 uses machine learning methods.

To employ machine learning, a training set of subscriber line data is created (step 192). The content the training set includes model lines with different values of the labels used by the decision tree to classify lines. If the decision tree classifies lines with the label "bridged tap present" and "bridged tap absent", then some of the lines of the training sets will have bridged taps and some of the lines will not have bridged taps. Similarly, in a stack of trees that classifies lines with a particular label, each tree therein is constructed from a training set having lines with different values of the particular label.

For each line of the training set, a computer and/or operator determines the values of a set of potential features and the classifying labels (194).

The potential features include one-ended measured and derived electrical properties that may be used in the tests of the decision tree. The potential electrical properties of one embodiment are listed in Appendix A. The potential features also include values of any auxiliary variables that may be used in the tests of the decision tree. For example, a decision tree used in step 177 of FIG. 17 would also include, as potential features, auxiliary variables determining whether a line is nominal and preliminarily qualified for preselected data services.

The classifying labels are the values of the auxiliary variables output by the decision tree. The values of these output auxiliary variables may, for example, include a determination of whether a line is nominal, qualified, or has a bridged tap.

Determinations of values of the classifying labels for the lines of the training set may use both one-ended and two-ended electrical measurements. For example, to classify a line of the training set as nominal or non-nominal a two-ended measurement of the actual attenuation and a one-ended measurement of the predicted attenuation are needed. Similarly, to determine the classifying label associated with qualification for data services, two-ended measurements of the actual attenuation are used. The two-ended measurements are not, however, used as inputs in the construction of decision trees.

From the values of the potential features and classifying labels of each line in the training set, the computer 46 recursively determines the branching tests of the decision tree (step 196).

Figure 22:
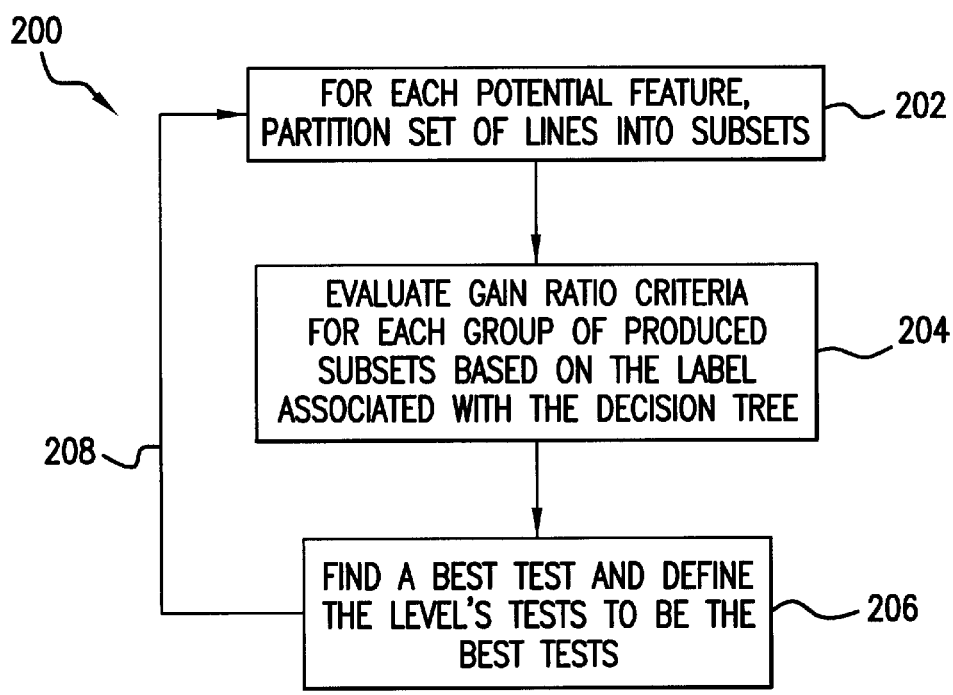
FIG. 22 is a flow chart for a method of determining the branching rules of the decision tree illustrated in FIGS. 19–20.

FIG. 22 is a flow chart for a method 200 of determining the branching tests of the decision tree 180 shown in FIGS. 19–20. For each potential feature, the computer 46 constructs a test and partitions the training set into groups of disjoint subsets (step 202). The test associated with a feature assigns each line of the training set to subsets according to a value of that feature for the line.

The computer 46 evaluates gain ratio criteria for the partitioning of the training set produced by each potential feature (step 204). The gain ratio criteria measures increases in consistency of line membership for different values of the classification label in each subset. The computer 46 uses the gain ratio criteria to find a best test and defines test 1 of the decision tree 180 to be the best test (step 206).

The computer loops back to perform steps 202, 204, and 206 for each subset produced by test 1 to determine the tests of level 2 of the decision tree 180 (loop 208). In these determinations, the subsets produced by the best test of level 1 become training sets for finding the tests of level 2. After performing steps 202, 204, and 206 for the subsets 1 and 2, the computer 46 has determined the tests 1.1 and 1.2 of the level 2 (loop 208). The computer 46 performs loop 208 either until further branches produce line classification errors below a preselected threshold or until no features remain.

Several methods exist for defining the best branching tests at each level of the decision tree 180 of FIG. 19. The C4.5 method defines best tests as tests producing the highest values of the gain ratio criteria. The C4.5* method randomly picks the best tests from the tests whose values of the gain ratio criteria are within a preselected selection percentage of the highest value.

The C4.5* algorithm predicts probabilities that a line with features "d" will be partitioned into each final subset of the decision tree. The probability that the line will be in the majority final subset L is:

$$P_L(d)=1-(\Sigma_{(j\ not\ in\ L)}N_j+1)/(\Sigma_{(i\ in\ L)}N_i+2).$$

Here, $N_i$ is the number of lines in subset "i". The probability that the line will be in a subset "i" is:

$$P_i(d)=[1-P_L(d)](N_i/\Sigma_{(j\ in\ L)}N_j).$$

In embodiments using the C4.5* algorithm, the above-described probabilities are the auxiliary variables used as features in the steps 175–177 of FIG. 17.

Various embodiments combine the methods of detecting line faults (70, 90), determining lines structures (140, 160), and stacking fault detection (170), shown in FIGS. 7, 8, 13, 15, 17. By combining the above-mentioned methods, these embodiments can better classify subscriber lines according to a variety of criteria. These criteria include presence of line conditions and faults, line speed, and qualification status.

Other embodiments are within the scope of the following claims.

What is claimed is:

1. A method of testing a subscriber line, comprising:
   performing a one-ended electrical measurements on the subscriber line at frequencies below a threshold;
   classifying the subscriber line based on the one-ended electrical measurements into one of at least two categories indicating the accuracy of predictions on the operation of the line at higher frequencies based on lower frequency measurements;
   predicting a performance characteristic of the subscriber line in a frequency range, including frequencies above the threshold, based on the combination of the category and the one-ended electrical measurements.

2. The method of claim 1,
   a) additionally comprising the step of making a preliminary performance prediction of the subscriber line and wherein predicting a performance characteristic includes predicting a performance characteristic of the subscriber line based on the combination of the category and the one-ended electrical measurements, and b) wherein the performance characteristic is presence of a line fault.

3. The method of claim 2, wherein the line fault is a bridged tap.

4. The method of claim 1, wherein classifying the subscriber line includes assigning the line to a first category that reflects lines having a nominal attenuation versus frequency characteristic or a second category that reflects lines not having a nominal attenuation versus frequency characteristics.

5. A method of detecting a fault in a subscriber line, comprising:
   a) making a preliminary classification of the line as qualified or disqualified for a data service line in response to one-ended electrical measurements thereon;
   b) using one-ended electrical measurements to assign the line an attenuation classification indicating the nature of the attenuation versus frequency characteristics of the line; and
   c) determining whether the line has a fault from the one-ended electrical measurements, the attenuation classification and the preliminary classification.

6. The method of claim 5, wherein the fault is one of a bridged tap and a gauge change.

7. The method of claim 5, wherein the measurements have frequencies of less than 100 KHz.

8. The method of claim 5, wherein an act of classifying includes assigning the line to a class that reflects whether the line has nominal or non-nominal attenuation versus frequency characteristics.

9. The method of claim 6, wherein an act of determining includes performing an analysis with a classifier, input data for the classifier including a determination of whether the line is qualified.

10. A method of manufacturing telephone line test equipment including a stack of classifiers for detecting line faults, comprising:
    selecting a learning set of subscriber lines, a portion of the lines having the fault and a portion of the lines not having the fault; and
    determining a form of a classifier from values of features and auxiliary variables of the lines in the learning set, the values of the auxiliary variables indicating whether the associated line has an attenuation versus frequency profile characteristic of a line in which performance of the line at higher frequencies can be inferred from lower frequencies.

11. The method of claim 10, further comprising:
    determining the form of a second classifier from values of features of the lines, the second classifier to output values of the auxiliary variables in response to receiving features of lines; and
    wherein the first and second classifier output different types of auxiliary variables.

12. The method of claim 10, wherein the features include one-ended electrical measurements.

13. The method of claim 10, wherein the determining further comprises:
    finding a best test that partitions the lines of the learning set into subsets according to whether the fault is present or absent.

14. The method of claim 10, wherein the faults are one of bridged taps and line gauge changes.

15. The method of claim 11, wherein at least one of the auxiliary variables output by the second classifier is a preliminary qualification status of the lines for a preselected data service.

* * * * *